(12) United States Patent
Sodagar et al.

(10) Patent No.: US 6,298,163 B1
(45) Date of Patent: Oct. 2, 2001

(54) APPARATUS AND METHOD FOR ENCODING WAVELET TREES GENERATED BY A WAVELET-BASED CODING METHOD USING BAND DEPENDENT TABLES

(75) Inventors: Iraj Sodagar, North Brunswick; Hung-Ju Lee, Robbinsville, both of NJ (US)

(73) Assignees: Sarnoff Corporation, Princeton, NJ (US); Sharp Corporation, Osaka (JP)

( * ) Notice: Subject to any disclaimer, the term of this patent is extended or adjusted under 35 U.S.C. 154(b) by 0 days.

(21) Appl. No.: 09/425,364

(22) Filed: Oct. 22, 1999

Related U.S. Application Data

(62) Division of application No. 09/002,251, filed on Dec. 31, 1997.
(60) Provisional application No. 60/037,055, filed on Feb. 12, 1997.

(51) Int. Cl.[7] .................. G06K 9/36; G06K 9/46
(52) U.S. Cl. ............................. 382/240; 382/244
(58) Field of Search .................. 341/51, 59, 65, 341/67, 79, 106; 348/395, 397–398.1, 403–404.1, 437–438.1, 395.1; 358/261.1, 261.2, 427, 430; 382/232, 239, 240, 245–248; 386/53; 375/240.01, 240.11, 240.21, 240.23

(56) References Cited

U.S. PATENT DOCUMENTS

| | | |
|---|---|---|
| 4,943,855 | 7/1990 | Bheda et al. .................. 348/398 |
| 5,048,111 | 9/1991 | Jones et al. .................. 382/56 |
| 5,073,820 | 12/1991 | Nakagawa et al. .................. 358/133 |
| 5,231,487 * | 7/1993 | Hurley et al. .................. 375/240.01 |
| 5,298,896 | 3/1994 | Lei et al. .................. 341/51 |
| 5,315,670 * | 5/1994 | Shapiro .................. 382/240 |
| 5,337,085 | 8/1994 | Lee et al. .................. 348/398 |
| 5,412,486 | 5/1995 | Bannai et al. .................. 358/444 |
| 5,412,741 | 5/1995 | Shapiro .................. 382/232 |
| 5,455,578 | 10/1995 | Bhandari .................. 341/106 |
| 5,485,210 | 1/1996 | Lim et al. .................. 348/395 |
| 5,506,687 | 4/1996 | Gillard et al. .................. 386/33 |
| 5,509,088 | 4/1996 | Robson .................. 382/233 |
| 5,526,299 | 6/1996 | Coifman et al. .................. 364/807 |
| 5,561,464 | 10/1996 | Park .................. 348/397 |
| 5,646,618 | 7/1997 | Walsh .................. 341/67 |
| 5,673,340 | 9/1997 | Kanda .................. 382/250 |
| 5,748,121 | 5/1998 | Romriell .................. 341/65 |
| 5,757,973 | 5/1998 | Wilkinson et al. .................. 382/246 |
| 5,764,805 * | 6/1998 | Martucci et al. .................. 382/238 |
| 5,781,906 * | 7/1998 | Aggarwal et al. .................. 707/102 |
| 5,929,912 | 7/1999 | Aono et al. .................. 348/398 |
| 6,040,864 | 3/2000 | Etoh .................. 348/397 |

FOREIGN PATENT DOCUMENTS

| | | |
|---|---|---|
| 58-3033 | 1/1983 | (JP) . |
| 58-003033 * | 1/1983 | (JP) .................. G06F/7/22 |

* cited by examiner

Primary Examiner—Timothy M. Johnson
(74) Attorney, Agent, or Firm—William J. Burke

(57) ABSTRACT

An apparatus and a concomitant method is disclosed for encoding wavelet trees in a wavelet-based coding technique, which the use of band dependent tables to address specific bands of the wavelet tree addresses.

17 Claims, 18 Drawing Sheets

FIG. 3
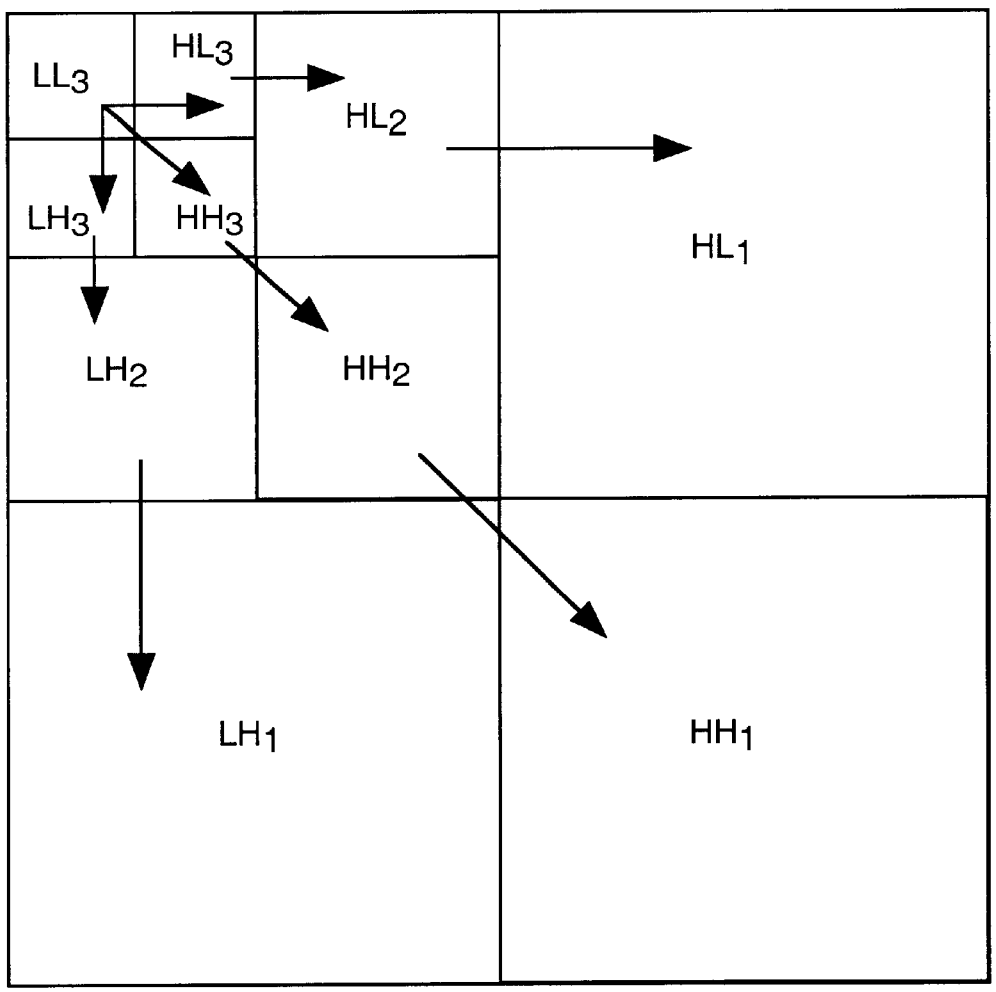
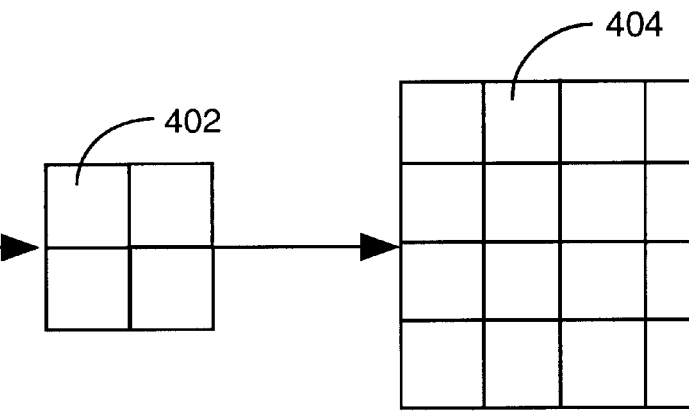
FIG. 4

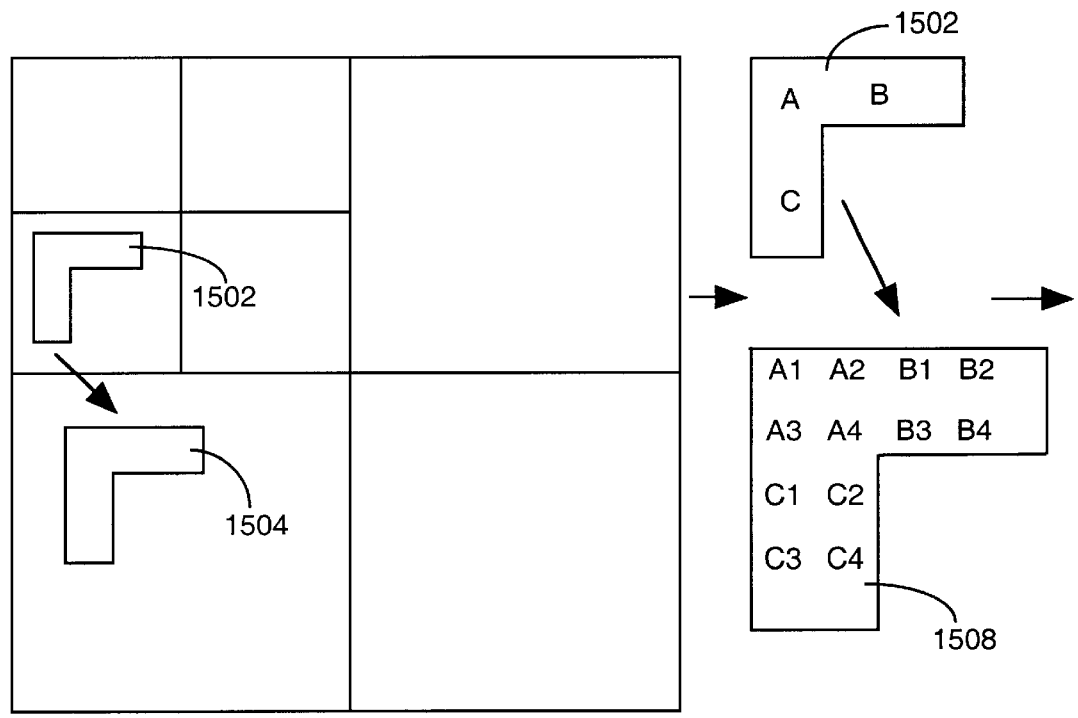
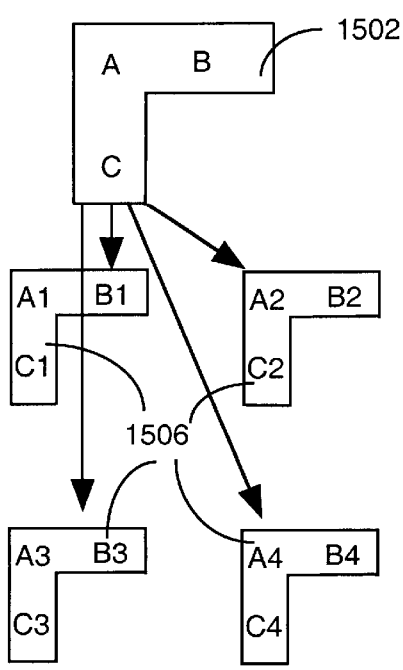
FIG. 15

APPARATUS AND METHOD FOR ENCODING WAVELET TREES GENERATED BY A WAVELET-BASED CODING METHOD USING BAND DEPENDENT TABLES

This is a division of application Ser. No. 09/002,251, filed on Dec. 31, 1997.

This application claims the benefit of U.S. Provisional Application No. 60/037,055 filed Feb. 12, 1997, which is herein incorporated by reference.

The invention relates to image processing systems and, more particularly, to image processing systems for coding balanced and unbalanced wavelet trees.

BACKGROUND OF THE DISCLOSURE

Data compression systems are useful for representing information as accurately as possible with a minimum number of bits and thus minimizing the amount of data which must be stored or transmitted in an information storage or transmission system. One of the primary means of compression used in the art removes redundant information from the original data without significantly impacting the quality of the decompressed data when compared to the original data.

One such compression technique appears in the Proceedings of the International Conference on Acoustics, Speech and Signal Processing, San Francisco, Calif. March 1992, volume IV, pages 657–660, where there is disclosed a signal compression system which applies a hierarchical subband decomposition, or wavelet transform, followed by the hierarchical successive approximation entropy-coded quantizer incorporating zerotrees. The representation of signal data using a multiresolution hierarchical subband representation was disclosed by Burt et al. in IEEE Trans. on Commun., Vol Com-31, No. 4, April 1983, page 533. A wavelet pyramid, also known as critically sampled quadrature-mirror filter (QMF) subband representation, is a specific type of multi-resolution hierarchical subband representation of an image. A wavelet pyramid was disclosed by Pentland et al. in Proc. Data Compression Conference Apr. 8–11, 1991, Snowbird, Utah. A QMF subband pyramid has been described in "Subband Image Coding", J. W. Woods ed., Kluwer Academic Publishers, 1991 and I. Daubechies, *Ten Lectures on Wavelets*, Society for Industrial and Applied Mathematics (SIAM): Philadelphia, Pa., 1992.

Wavelet transforms, otherwise known as hierarchical subband decomposition, have recently been used for low bit rate image compression because such decomposition leads to a hierarchical multi-scale representation of the source image. Wavelet transforms are applied to an important aspect of low bit rate image coding: the coding of a binary map (a wavelet tree) indicating the locations of the non-zero values, otherwise known as the "significance map" of the transform coefficients. Using scalar quantization followed by entropy coding, in order to achieve very low bit rates, i.e., less than 1 bit/pel, the probability of the most likely symbol after quantization—the zero symbol—must be extremely high. Typically, a large fraction of the bit budget must be spent on encoding the significance map. It follows that a significant improvement in encoding the significance map translates into a significant improvement in the compression of information preparatory to storage or transmission.

To accomplish this task, a new structure called a "zerotree" has been developed. A wavelet coefficient is said to be insignificant with respect to a given threshold T, if the coefficient has a magnitude less than or equal to T. The zerotree is based on the hypothesis that if a wavelet coefficient at a coarse scale is insignificant with respect to a given threshold T, then all wavelet coefficients of the same orientation in the same spatial location at finer scales are likely to be insignificant with respect to T. Empirical evidence suggests that this hypothesis is often true.

More specifically, in a hierarchical subband system, with the exception of the highest frequency subbands, every coefficient at a given scale can be related to a set of coefficients at the next finer scale of similar orientation according to a structure called a wavelet tree. The coefficients at the coarsest scale will be called the parent nodes, and all coefficients corresponding to the same spatial or temporal location at the next finer scale of similar orientation will be called child nodes. For a given parent node, the set of all coefficients at all finer scales of similar orientation corresponding to the same location are called descendants. Similarly, for a given child node, the set of coefficients at all coarser scales of similar orientation corresponding to the same location are called ancestors. With the exception of the lowest frequency subband, all parent nodes have four child nodes. For the lowest frequency subband, the parent-child relationship is defined such that each parent node has three child nodes.

Nodes are scanned in the order of the scales of the decomposition, from coarsest level to finest. This means that no child node is scanned until after its parent and all other parents in all subbands at the same scale as that parent have been scanned. This is a type of modified breadth-first, subband by subband, traversal performed across all the wavelet trees defined by the coefficients of the wavelet transform of the two-dimensional data set.

Given a threshold level to determine whether or not a coefficient is significant, a node is said to be a ZEROTREE ROOT if 1) the coefficient at a node has an insignificant magnitude, 2) the node is not the descendant of a root, i.e., it is not completely predictable from a coarser scale, and 3) all of its descendants are insignificant. A ZEROTREE ROOT is encoded with a special symbol indicating that the insignificance of the coefficients at finer scales is completely predictable. To efficiently encode the binary significance map, four symbols are entropy coded: ZEROTREE ROOT, ISOLATED ZERO, and two non-zero symbols, POSITIVE SIGNIFICANT and NEGATIVE SIGNIFICANT.

U.S. Pat. No. 5,412,741 issued May 2, 1995 and herein incorporated by reference discloses an apparatus and method for encoding information with a high degree of compression. The apparatus uses zerotree coding of wavelet coefficients in a much more efficient manner than any previous techniques. The key to this apparatus is the dynamic generation of the list of coefficient indices to be scanned, whereby the dynamically generated list only contains coefficient indices for which a symbol must be encoded. This is a dramatic improvement over the prior art in which a static list of coefficient indices is used and each coefficient must be individually checked to see whether a) a symbol must be encoded, or b) it is completely predictable.

The apparatus disclosed in the '741 patent also uses a method for encoding information comprising the steps of forming a wavelet transform of the image, forming a zerotree map of the wavelet coefficients, encoding the significant coefficients on an initial dominant list from the coarsest level of the transform and the children of those coefficients whose indices are appended to the dominant list as the coefficient of the parent is found to be significant, reducing the threshold, refining the estimate of the value of the significant coefficients to increase the accuracy of the coded coefficients, and cycling back to scan the dominant list anew at the new, reduced threshold.

To accomplish the iterative process, the method of the '741 patent is accomplished by scanning the wavelet tree subband by subband, i.e., all parent nodes are coded, then all children, then all grandchildren and so on and they are encoded bit-plane by bit-plane. As the process iterates through the wavelet tree representation of the image, this apparatus codes one of four symbols within the zerotree map. The methods as discussed in the '741 patent are known as the "Embedded Zerotree Wavelet" (EZW) method. Any improvement in the speed at which a wavelet tree is processed would be advantageous.

Therefore, there is a need in the art for an improved method of classifying and coding the nodes of a wavelet tree that leads to more efficient coding and rapid processing.

SUMMARY OF THE INVENTION

The present invention is an apparatus and a concomitant method of encoding wavelet trees in a wavelet-based coding technique, which addresses unbalanced wavelet trees and increases the overall coding efficiency.

More specifically, in one embodiment of the present invention, an unbalanced wavelet tree is remapped onto a balanced wavelet tree. Nodes that are not present in the unbalanced wavelet tree are marked as empty nodes in the corresponding nodes in the new balanced wavelet tree.

In another embodiment, band dependent tables are established to code coefficients within the relevant bands. Namely, a dedicated band dependent table is employed to code the coefficients of one or more bands of the wavelet tree. Additionally, band dependent tables can be provided for predefined sets of bands.

In another embodiment, a difference value is generated to code the coefficients of the wavelet tree.

The present invention can be employed in conjunction with the zerotree entropy coding method, the embedded zerotree wavelet coding method and the concepts of object and vector wavelets.

BRIEF DESCRIPTION OF THE DRAWINGS

The teachings of the present invention can be readily understood by considering the following detailed description in conjunction with the accompanying drawings, in which:

FIG. 3 is a schematic illustration of parent-child dependencies of subbands in an image decomposed to three scales within a wavelet tree;

FIG. 4 depicts the parent-child relationship for three generations of a subsampled image;

FIG. 15 depicts an object parent-child relationship;

To facilitate understanding, identical reference numerals have been used, where possible, to designate identical elements that are common to the figures.

DETAILED DESCRIPTION

Figure 1:
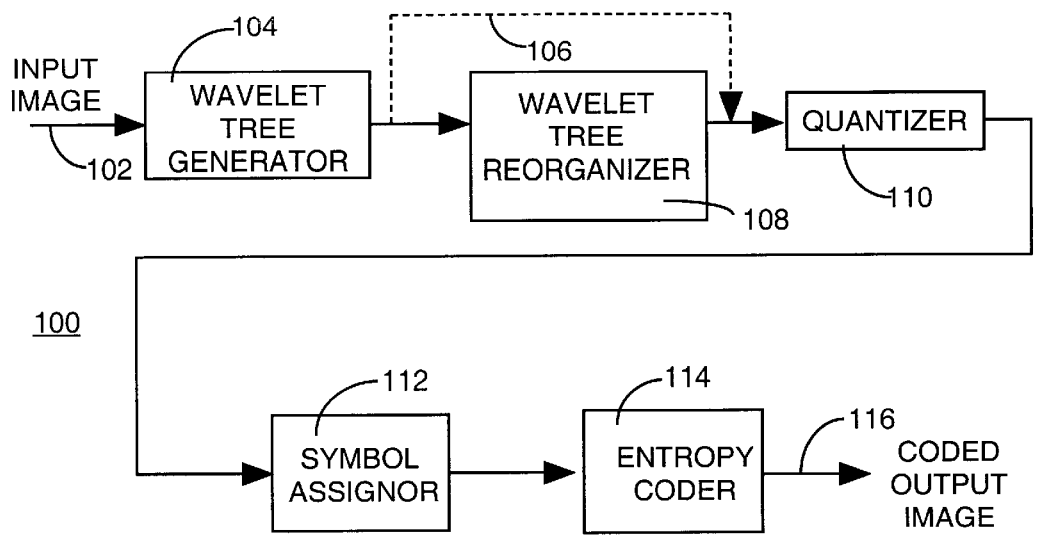
FIG. 1 is a block diagram of an image encoder of the present invention.
Figure 2:
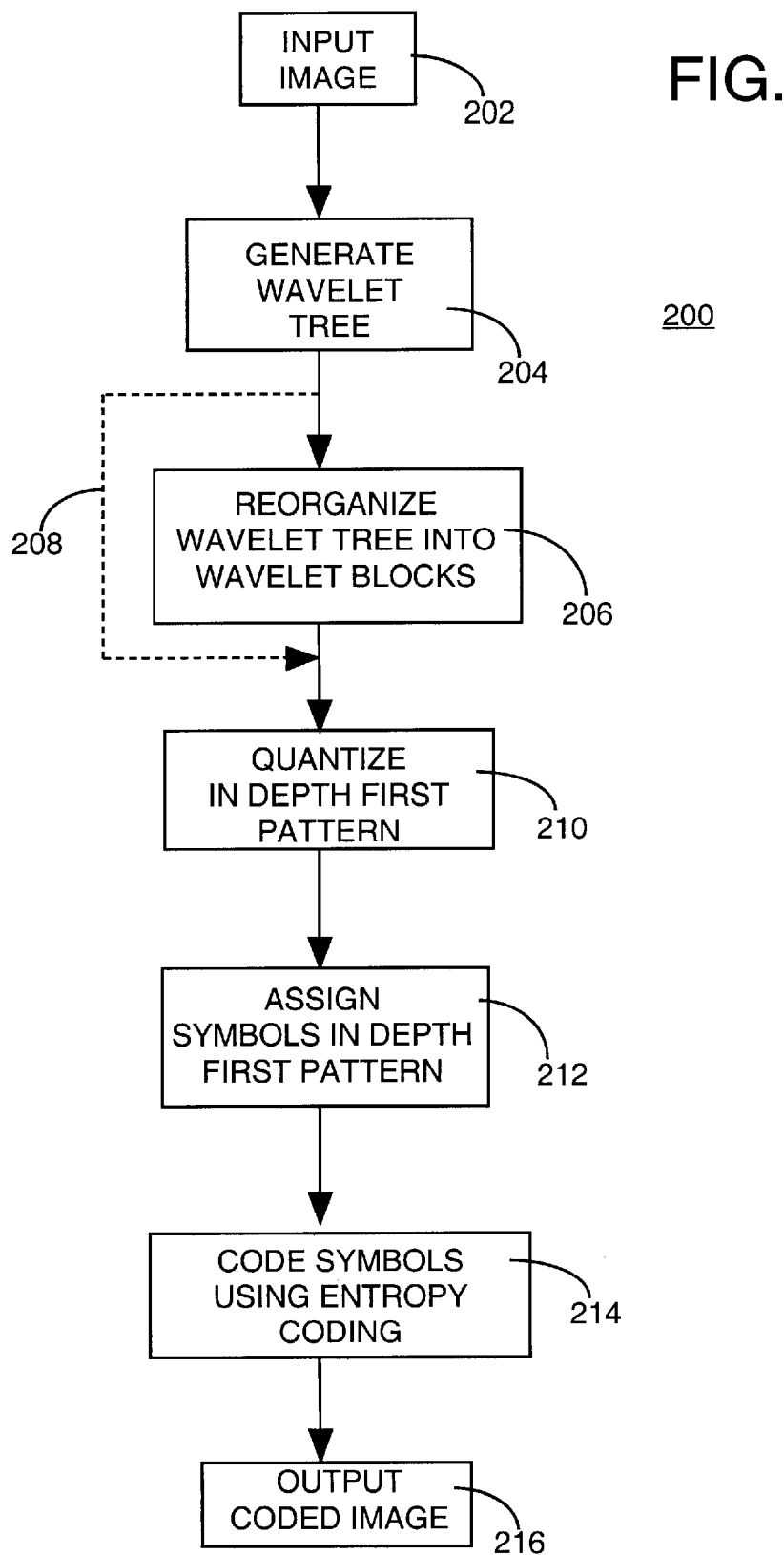
FIG. 2 is a flowchart illustrating the encoding method of the encoder shown in FIG. 1.

FIG. 1 depicts a block diagram of an encoder 100 of the present invention and FIG. 2 depicts a flowchart representation of the operation of the encoder 100 of FIG. 1. To best understand the invention, the reader should simultaneously consult both FIGS. 1 and 2 while reading the following description of the invention.

The encoder 100 contains a wavelet tree generator 104, an optional wavelet tree reorganizer 108, a quantizer 110, a symbol assignor 112, and an entropy encoder 114. Each of these components is connected in series to process an image at port 102 into a coded output image at port 116. The input image is typically a pixelated (digitized) photographic image as can be produced from an image scanner or a computer graphics system. However, the input image can also be a frame within a series of frames of video images or a motion compensated residual frame produced by a video encoding system. In general, the invention processes any form of digitized image or portion thereof. Thus, the method of operation generally begins at step 202 with the input of an "image", i.e., any form of two-dimensional data.

The wavelet tree generator 104 performs (at step 204) a wavelet hierarchical subband decomposition to produce a conventional wavelet tree representation of the input image. To accomplish such image decomposition, the image is decomposed using times two subsampling in each of two-dimensions into high horizontal-high vertical (HH), high horizontal-low vertical (HL), low horizontal-high vertical (LH), and low horizontal-low vertical (LL), frequency subbands. The LL subband is then further subsampled times two in each of two dimensions to produce a set of HH, HL, LH and LL subbands. This subsampling is accomplished recursively to produce an array of subbands such as that illustrated in FIG. 3 where three subsamplings have been used. Preferably four or more subsamplings are used in practice, but the present invention can be adapted to any number of subsamplings. The parent-child dependencies between subbands are illustrated as arrows pointing from the subband of the parent nodes to the subbands of the child nodes. The lowest frequency subband is the top left $LL_3$, and the highest frequency subband is at the bottom right $HH_1$. In this example, all child nodes have one parent. A detailed discussion of subband decomposition is presented in J. M. Shapiro, "Embedded Image Coding Using Zerotrees of Wavelet Coefficients", IEEE Trans. on Signal Processing, Vol. 41, No. 12, pp. 34455–62, Dec. 1993.

FIG. 4 depicts the parent-child relationship for three generations of a subsampled image. A single parent node 400 has four child nodes 402 corresponding to the same region in the image with times four subsampling, i.e., times two subsampling in each of two dimensions. Each child node 402 has four corresponding next generation child nodes 404 with a further times four subsampling. The relationship, or data structure, that relates a parent node to its children and grandchildren is a wavelet tree. Note that each pel or pixel in the low-low subband has a "tree" associated with it. However, the plurality of trees that extend from the low-low subband taken together are generally discussed in the art as the "wavelet tree" for the image. This disclosure will also follow this nomenclature.

Returning to FIGS. 1 and 2, the quantizer 110 quantizes (at step 210) the coefficients of the wavelet tree via path 106 in a "depth-first" pattern. A depth-first pattern is very dissimilar from the prior art encoding systems in that the prior art encoding systems traverse the wavelet tree in a modified breadth-first pattern across all subbands, i.e., quantize all parent nodes, then all children, then all grandchildren and so on. In contrast, the inventive method traverses each tree in "depth-first" order, i.e., from the root in the low-low subband ($LL_3$) through the children.

Figure 5:
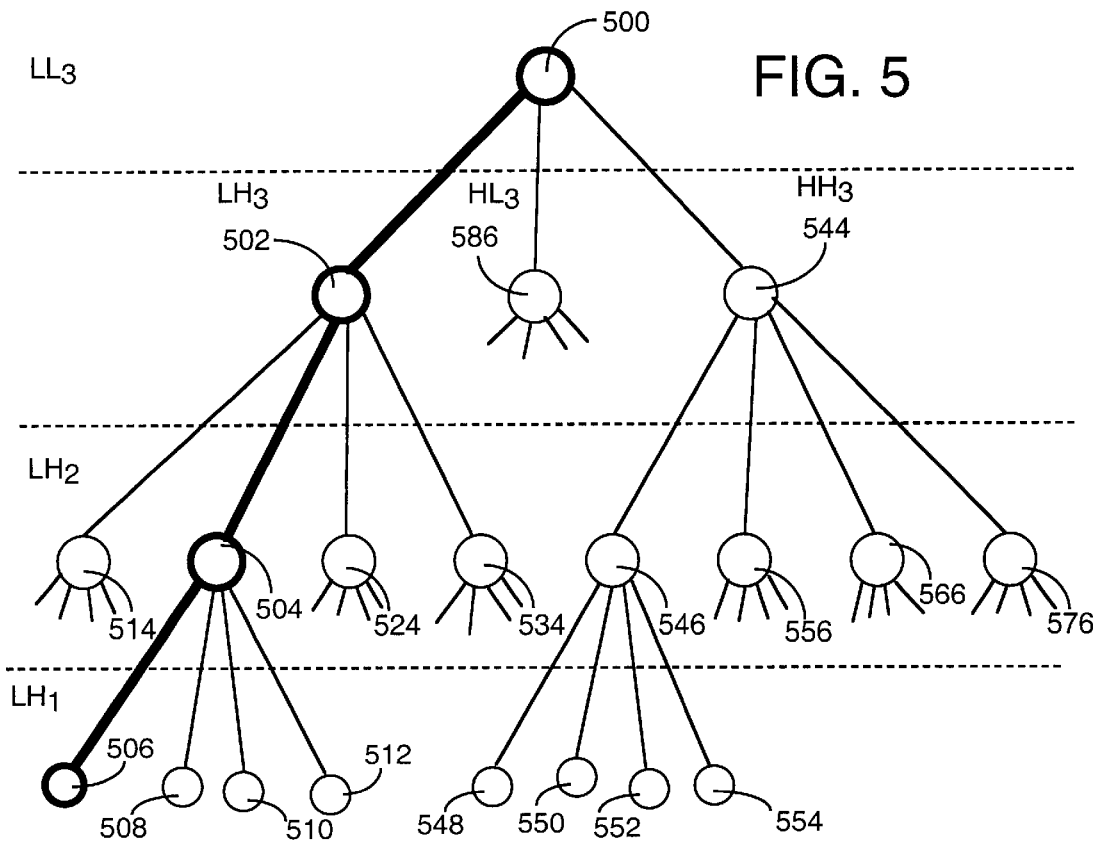
FIG. 5 depicts a schematic representation of the interrelation of various nodes within a wavelet tree.

FIG. 5 depicts the depth-first pattern used to traverse each tree. For example, beginning at node 500 in $LL_3$ and following the bold path, the inventive depth-first process proceeds to node 502 in subband $LH_3$ and then to node 504 in subband $LH_2$. From node 504, the depth-first traversal process successively continues to nodes 506, 508, 510 and 512 within subband $LH_1$, i.e., all the children of node 504, then continues on to the siblings of 504 (514, 524, 534) where the four children of each sibling are traversed before the next sibling and its children. Once this entire branch of the tree is traversed, the traversal process proceeds to another child node of node 500, for example, node 544. From that node, the depth-first traversal process proceeds to nodes 546, 548, 550, 552 and 554 before going on to node 556 and so on.

As each branch is traversed, the coefficients are quantized into discrete values. Any quantization approach can be used with the present invention. The quantization process maps a continuous coefficient value to a discrete value having either a positive value, a negative value or zero value. In sum, in a depth-first scan pattern, children 506, 508, 510, and 512 are scanned after their parent 504 and before any of the neighboring parents 514, 524 and 534. In this manner, all coefficients that represent a given spatial location are scanned, in ascending frequency order from parent 500 to child 502 to grandchild 504 and so on, before the coefficients of the next adjacent spatial location is scanned.

Although the foregoing description of the depth-first scanning pattern was discussed as a "top down" pattern, a depth-first scanning pattern also includes scanning from the bottom up. As such, the quantization can also be accomplished by starting at a tree's "leaves" (the bottom-most nodes) and proceeding up the tree. Using the example of FIG. 5, in a "bottom up" pattern, nodes 506, 508, 510 and 512 would be quantized first, then node 504, and so on up the tree to 500 last. Once that tree was complete, the quantization process would quantize another tree, and another, and so on until all the nodes in all the trees were quantized. As shall be discussed below, the invention operates more efficiently when using a bottoms up pattern than the top down.

To facilitate this depth-first scanning pattern, the invention reorganizes the quantized coefficients of each wavelet tree to form a "wavelet block". As shown in FIGS. 1 and 2, the reorganization is accomplished (at step 206) in the wavelet tree reorganizer 108 prior to quantization.

Figure 6:
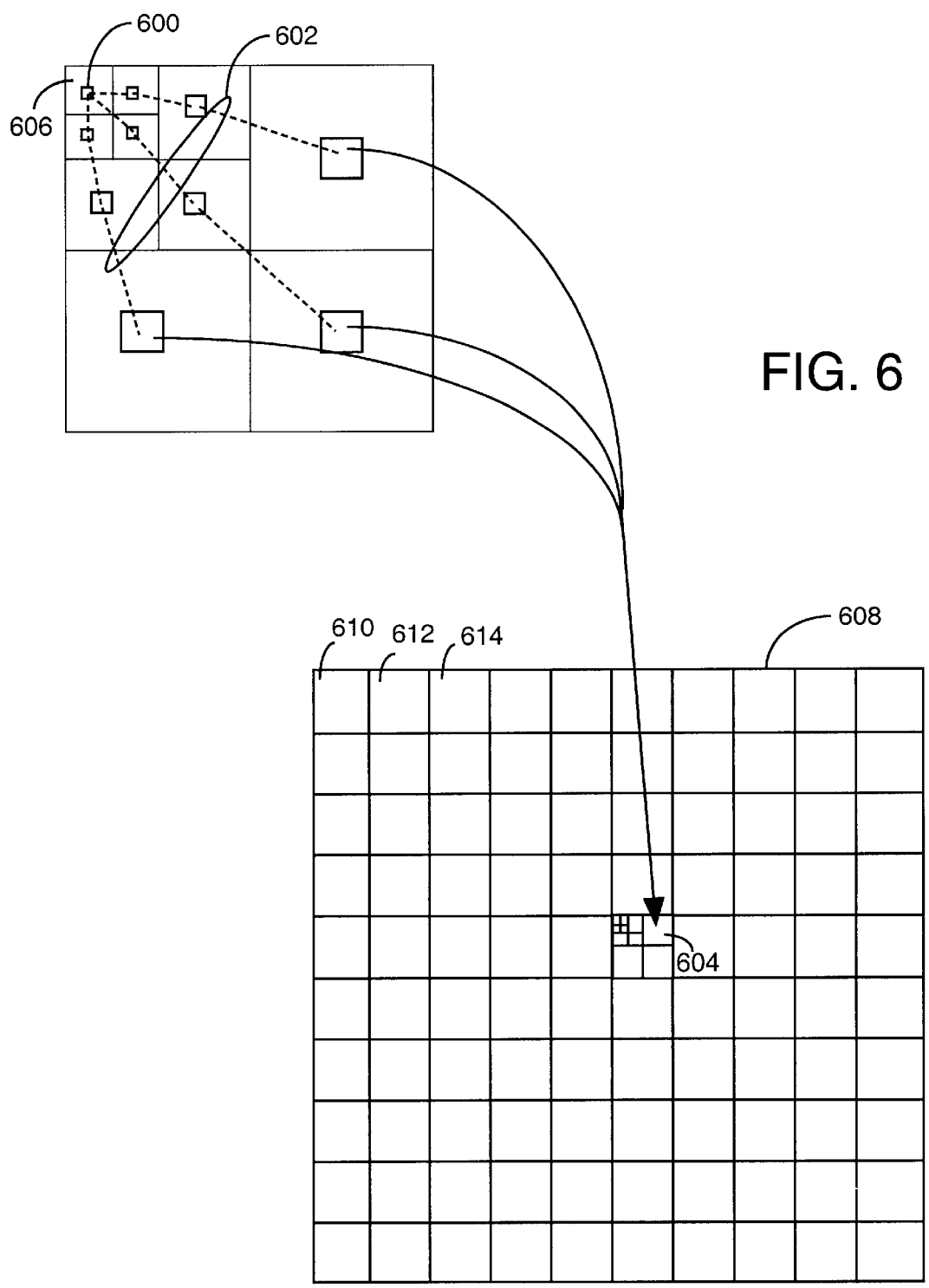
FIG. 6 depicts a wavelet block representation of a wavelet tree.

FIG. 6 schematically depicts a wavelet block 604 that is generated by the invention. The invention maps a tree 602 extending from a pixel 600 in the low-low band 606 ($LL_3$) in the wavelet tree 602 into a wavelet block 604. Each wavelet block 604 of an image frame 608 comprises those coefficients at all scales and orientations that represent the frame at the spatial location of the block within the frame. The reorganization is accomplished by physically remapping the memory locations of the coefficients to new memory locations that form the wavelet blocks. As such, all the coefficients of a given wavelet block are stored at sequential address locations. Alternatively, the coefficients are not physically rearranged, but are rather remapped into a virtual memory. Thus, an index into the physical memory is created, where the index (virtual memory) has memory locations that are arranged into wavelet blocks. For each access into the index, the address into the index is mapped to a physical memory location where the coefficient is stored. Thus, by a virtual memory approach, the advantages of wavelet blocks are available without physically rearranging the coefficients in memory.

By using a depth-first scanning pattern, each wavelet block is completely scanned to quantize its coefficients before the next block is scanned and so on. For example, block 610 is completely scanned, then block 612, then block 614, and so on in a raster scan pattern through the frame of wavelet blocks. The ordering of blocks does not have to be in a raster scan pattern, but can be any order as desired by the application. This includes object-oriented whereby blocks corresponding to certain objects are scanned and coded before other objects. Since an entire block is located at consecutive memory addresses, the block can easily be scanned in a top down or bottoms up pattern by selecting either the first or last memory entry for a given block and accessing all other addresses in ascending or descending order.

Importantly, with such reorganization, each wavelet block can be assigned a different quantizer scale based on its spatial location in the frame. This permits the quantizer 110 to be allocated specifically for a spatial location of the coefficients and/or in accordance with the frequency band represented by the coefficient. As such, the scale of the quantizer can be different across an image such that the center of the image or certain objects within the image can be more accurately quantized than the edges. Similarly, the quantizer scale could be frequency dependent such that higher frequency (or, for that matter, lower frequencies, middle frequencies, various frequency bands, and the like) can be quantized using a scale that is different from other frequencies. Also, instead of a single quantizer, a quantization matrix can be used to code each wavelet block.

In a particular application, such as a video-phone, the foreground object(s), e.g., the head and shoulders of a caller, are selected for quantization with more accuracy than the background objects. Consequently, the important information is accurately coded and transmitted, while background information is less accurately coded. The use of wavelet blocks allows for easy bifurcated coding of foreground and background information. Once a region is selected for accurate coding, the invention can flag the blocks that require accurate coding. As such, the quantizer quantizes those blocks using a finer quantization step than is used on the unflagged blocks.

Although wavelet blocks form an intuitive data structure for implementing the invention, use of wavelet blocks is optional and is not necessary to the implementation of the inventive encoder 100 and other encoders described below. As shall be discussed below, the conventional tree structure can be used in conjunction with the improved tree traversal process and the improved coding technique of the present invention. As such, FIGS. 1 and 2 depict the optional nature of the reorganizer as path 106 and path 208 which respectively bypass the reorganizer and its associated function.

After quantization, at each node of the tree, the quantized coefficient has either a zero value or a non-zero value. "Zerotrees" exist wherever the coefficient at a node is zero and all its descendants form zerotrees, i.e., all descendant nodes have a zero value. The quantized coefficients of the wavelet tree are efficiently encoded by again scanning each tree in a depth-first manner. Thus, symbol assignor 112 operates (at step 212) by traversing the tree and assigning particular symbols to each node depending upon the node's quantized value as well as the quantized values of each node's descendants. Specifically, at each node, the inventive method assigns one of three symbols: ZEROTREE ROOT, VALUED ZEROTREE ROOT, and VALUE. A ZEROTREE ROOT denotes a coefficient that is the root of a zerotree. After the scan in which symbols are assigned, the zerotree does not need to be scanned any further because it is known that all coefficients in the tree have the value zero. A VALUED ZEROTREE ROOT is a node where the coefficient has a non-zero value and all four children are ZEROTREE ROOTS. The coding scan of this tree never progresses below this node. A VALUE symbol identifies a coefficient with a value, either zero or non-zero, but also with some descendant somewhere further along the tree that has a non-zero value. As an option, a fourth symbol, Isolated Zero(IZ), can be added to the significant map. In this case, IZ symbol identifies a coefficient with zero value, but with some descendant somewhere further along with a nonzero. If IZ is added, then VAL only represents the nonzero coefficient which has one or more nonzero descendants.

Figure 7:
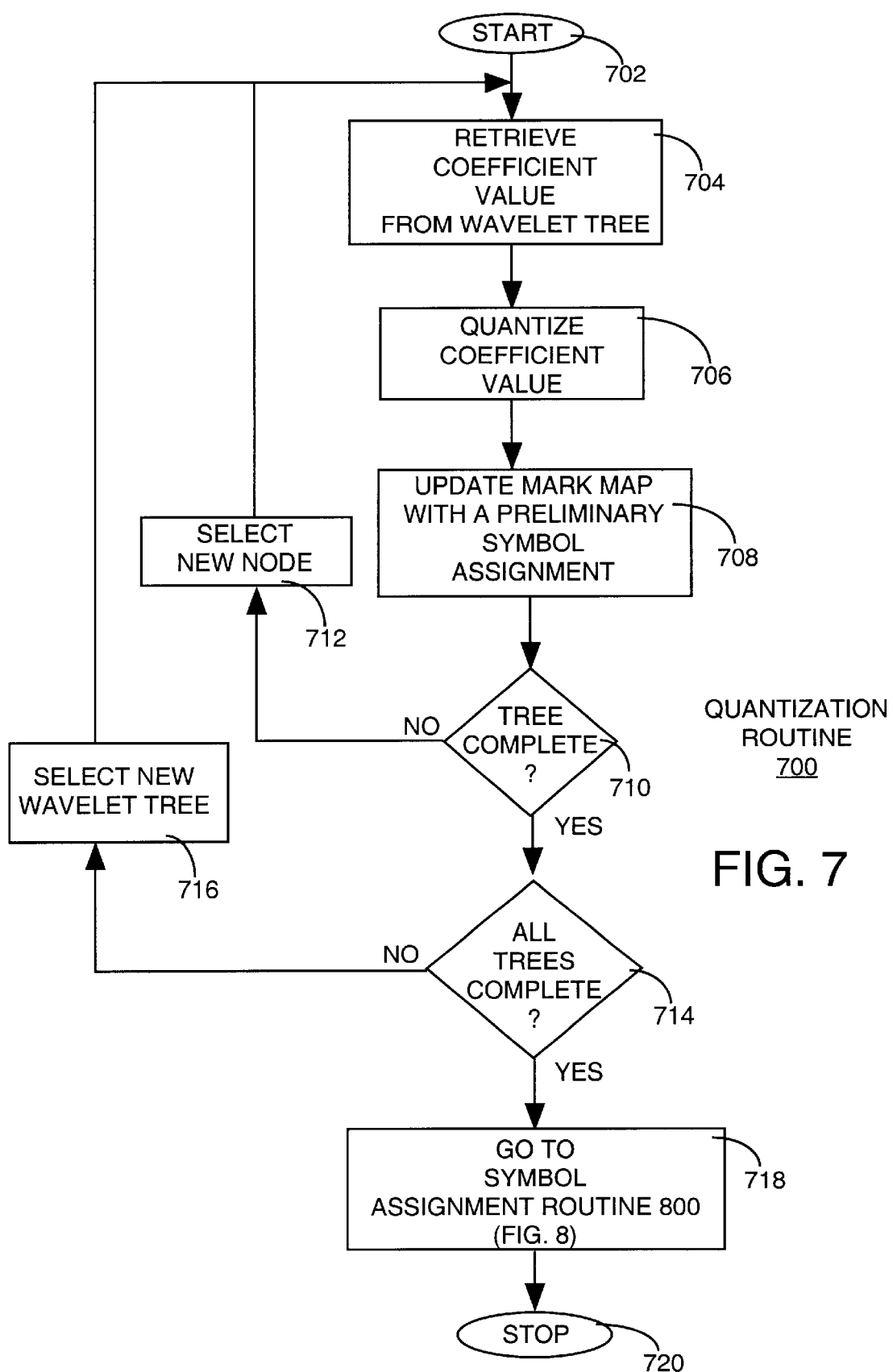
FIG. 7 depicts a flowchart of a quantization method executed by the present invention.
Figure 8:
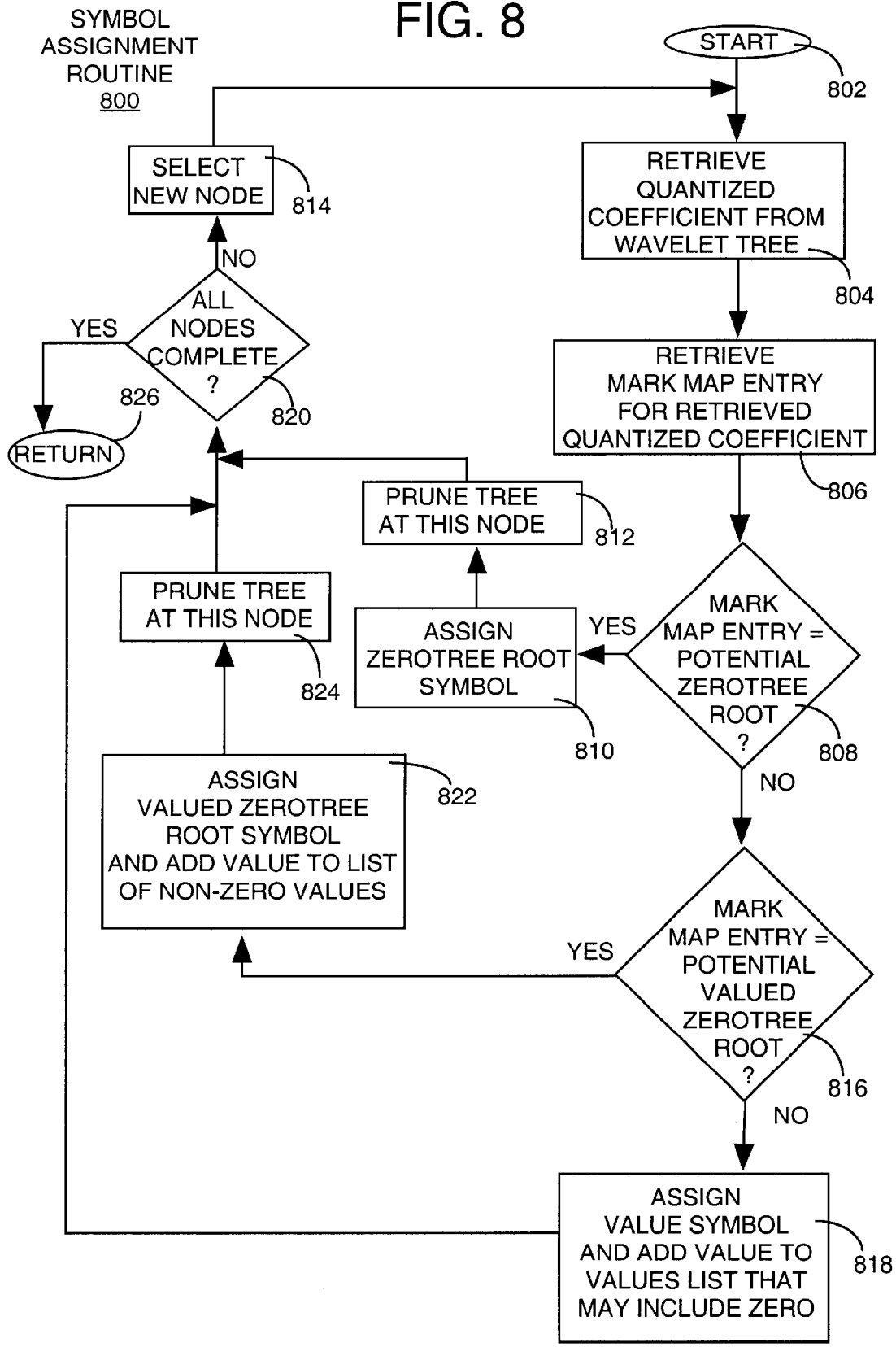
FIG. 8 depicts a flowchart of a symbol assignment method executed by the present invention.

To most efficiently scan the trees to quantize and assign symbols to the nodes, the quantizer operates in conjunction with the symbol assignor. FIG. 7 depicts a detailed flowchart of a quantization method 700 used to quantize the coefficients of a zerotree and FIG. 8 depicts a detailed flowchart of a symbol assignment method 800 for assigning symbol values to represent the quantized coefficient values.

The method 700 begins at block 702 and proceeds to step 704 where a coefficient value is retrieved from a node in a wavelet tree. As shall be discussed below, the quantization method scans the wavelet tree in a bottom up, depth-first pattern. Thus, the first address is always in the highest frequency subband and, with each iteration through the method, the method proceeds up the tree to lower and lower frequency subbands. As the quantized values are generated, the method keeps track of the quantized values of the child nodes, i.e., are the children valued or zero. At step 706, the method quantizes the retrieved coefficient value into a positive value, a negative value, or zero value. At step 708, a mark map is updated with a preliminary symbol value for the node associated with the coefficient value just quantized. The mark map symbol depends upon the value of the child nodes as well as the value of the present node. Note that, because the scan is accomplished bottom up, the mark map is not capable of conclusively indicating whether a node is a ZEROTREE ROOT or not. Consequently, after all the nodes are assigned a preliminary symbol value, the tree is scanned again in a top down pattern to conclusively assign symbol values. The mark map is an index of the wavelet tree nodes which is filled by the quantization method 700. At each address in the mark map, the method stores a preliminary symbol: potential VALUE, potential VALUED ZEROTREE ROOT, or potential ZEROTREE ROOT (and optionally, ISOLATED ZERO). If the quantized coefficient value has a value, the mark map location for that coefficient is marked with a potential VALUE symbol. If the quantized coefficient value is zero value and all of that nodes children are zero valued, then the mark map location is marked with a potential ZEROTREE ROOT. Optionally, if the quantized coefficient has zero value, but some of its descendants are nonzero, then it is marked with the Isolated Zero symbol. Lastly, if the quantized value has a value and its children are all zero valued, then the mark map location is marked with a potential VALUED ZEROTREE ROOT.

At step 710, the method queries whether all the nodes in the wavelet tree have been quantized. If the query is negatively answered, the method proceeds to step 712 where a new (next) node or tree in the wavelet tree is selected for quantization. The method then returns to step 704. If the query at step 710 is affirmatively answered the method proceeds to step 714. The method queries at step 714 whether all the trees have been quantized. If the query is negatively answered, the method selects, at step 716, a new (next) tree or quantization. If the query at step 714 is affirmatively answered, the method proceeds to step 718. At this point in method 700, all the nodes in all the trees have been quantized and assigned a preliminary symbol. At step 718, the method 700 calls symbol assignment method 800 of FIG. 8. After the symbols are assigned, method 700 ends at block 720.

Method 800 scans the trees in a top down pattern, i.e., root to leaves. However, the method does not need to access every node because the trees are pruned at each occurrence of a ZEROTREE ROOT or a VALUED ZEROTREE ROOT. Specifically, method 800 is entered at step 802 and proceeds to step 804. At step 804, the method retrieves a quantized coefficient from the tree of quantized coefficients. At step 806, the method retrieves the preliminary symbol in the mark map that corresponds to the retrieved coefficient. The method queries at step 808 whether the preliminary symbol is a potential ZEROTREE ROOT. If the query is affirmatively answered, the method assigns, at step 810, the ZEROTREE ROOT symbol to the node. Then, at step 812, the method prunes the tree, i.e., the method ignores all nodes below this ZEROTREE ROOT node because, by definition, all the nodes have a zero value.

The method queries at step 820 whether all nodes have been selected. If the query at step 820 is negatively answered, the method proceeds along the NO path to step 814. At step 814, the method selects the next node, after any pruned branches are skipped, in the tree such that a top down, depth-first scan is accomplished.

If the query at step 808 is negatively answered, the method proceeds along the NO path to step 816. At step 816, the method queries whether the mark map contains a potential symbol of potential VALUED ZEROTREE ROOT. If the query at step 816 is affirmatively answered, the method, at step 822, assigns a VALUED ZEROTREE ROOT symbol to the node, puts the value on a list of non-zero values, and prunes the tree at step 824. The method queries at step 820 whether all nodes have been selected. If the query at step 820 is negatively answered, the method proceeds to step 814. Then the method, at step 814, selects the next node for symbol assignment, skipping the pruned branches.

If the query at step 816 is negatively answered, the method assigns, at step 818, a VALUE symbol to the node, and puts a value on the list of values that include the value zero. The method queries at step 820 whether all nodes have been selected. If the query at step 820 is negatively answered, the method proceeds to step 814. Then, the method selects, at step 814, the next node for symbol assignment.

The assignment method continues until all nodes have had symbols assigned to them. Thus, if the query at step 820 is affirmatively answered, the method proceeds to step 826, where the method 800 ends or returns to method 700. The methods as discussed in FIGS. 7 and 8 are collectively known as Zero-Tree Entropy coding (ZTE).

Returning to FIGS. 1 and 2, the symbols and values are encoded (at step 214) using an entropy coder 114, such as a conventional arithmetic coder. One possible way to accomplish encoding is as follows. The symbols are encoded using a three-symbol alphabet. The list of non-zero values that correspond one-to-one to the VALUED ZEROTREE ROOT symbols is encoded using an alphabet that does not include the value zero. The remaining coefficients, which correspond one-to-one to the VALUE symbols, are encoded using an alphabet that does include the value zero. For any node reached in a scan that is a leaf with no children, neither root symbol could apply. Therefore, some bits can be saved by not encoding any symbol for this node and encoding the coefficient using the alphabet that includes the value zero.

An illustrative encoder using a three-symbol or optionally four symbol coding alphabet for the symbols and a multi-symbol alphabet for the values would follow that disclosed in Witten et al., "Arithmetic Coding for Data Compression", Comm. of the ACM, Vol. 30, No. 6, pp. 520–540, June 1987. In fact, those skilled in the art will realize that the present invention can be modified by simply encoding only the values (or representations of those values) of the coefficients in accordance with the assigned symbols. Namely, only the values of the coefficients are encoded without having to encode the symbols that indicated the importance of the coefficients.

The encoder 100 generates (at step 216) the coded output image at port 116. Through utilization of the present invention, an image is rapidly and efficiently coded using one of three symbols at each node of a wavelet tree plus bits to encode coefficient values.

A plurality of alternate embodiments of the present invention applies the present coding scheme to vector or object zerotree coding for images or video. Namely, the present coding scheme, using a wavelet transform, is applied to the concept of vector (or object) zerotree coding which entails quantization and zerotree entropy coding of the quantized wavelet coefficients. Each of the vector or object zerotree coding embodiments of the present invention constitutes a vector or object approach to using zerotrees to encode wavelet coefficients for images or video residuals. Associated with each node of each wavelet tree is a list of coefficients (a vector) rather than a single coefficient. Tree nodes are scanned, coefficients quantized, and symbols entropy coded all using a method called Vector ZeroTree Entropy coding.

Figure 11:
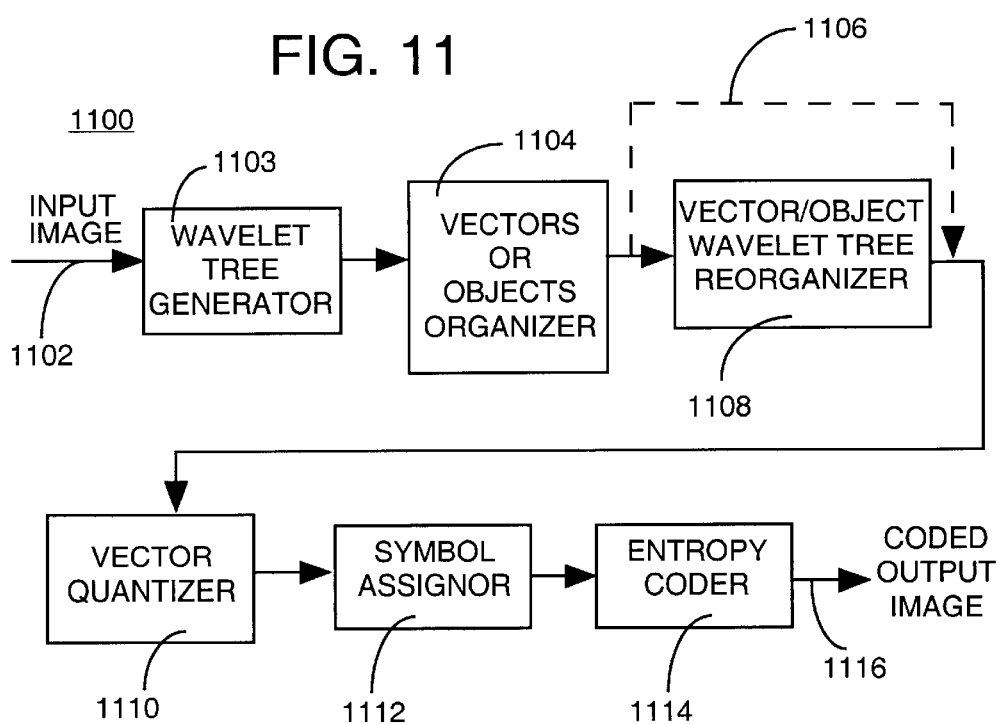
FIG. 11 depicts a block diagram of one embodiment of a scalar-wavelet transform followed by vectors or object grouping.
Figure 12:
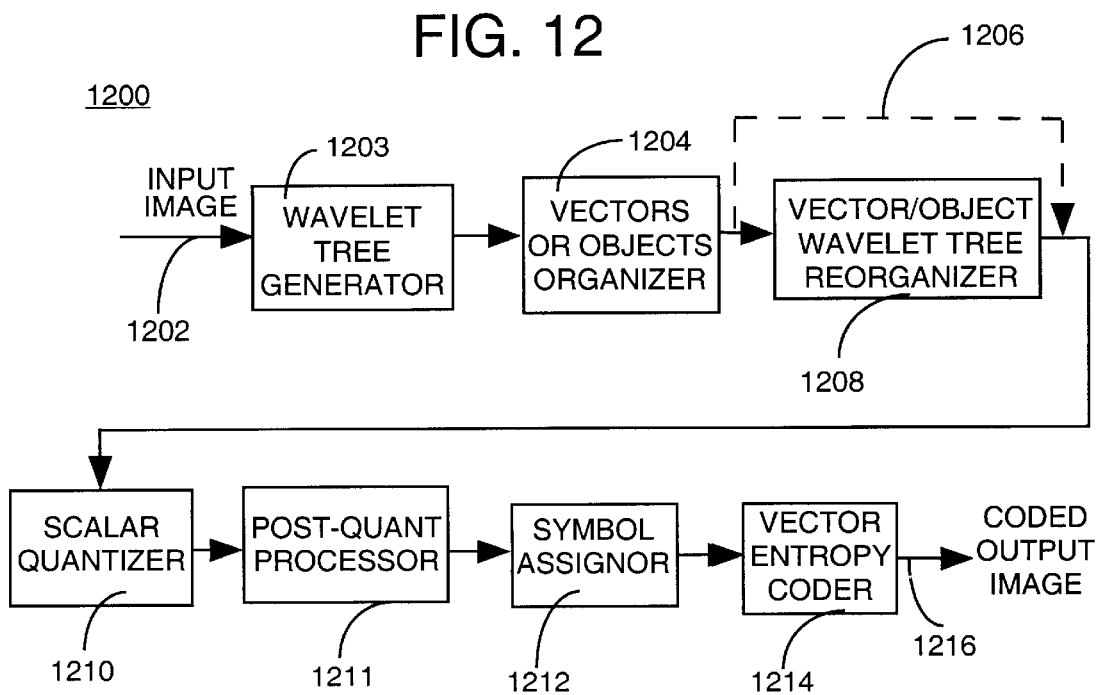
FIG. 12 depicts a block diagram of another embodiment of a scalar-wavelet transform followed by vectors or object grouping.

The various vector or object zerotree coding embodiments fall into two categories, scalar-wavelet transformation followed by vectors (or objects) grouping, or vectors (or objects) grouping followed by vector-wavelet transformation. Namely, an image, a video frame, or a frame of motion-compensated video residuals is first either scalar-wavelet transformed or vector-wavelet transformed. FIGS. 11–12 illustrate the first category where the scalar wavelet is first computed, then wavelet coefficients are grouped into vectors or objects after the transformation.

Figure 9:
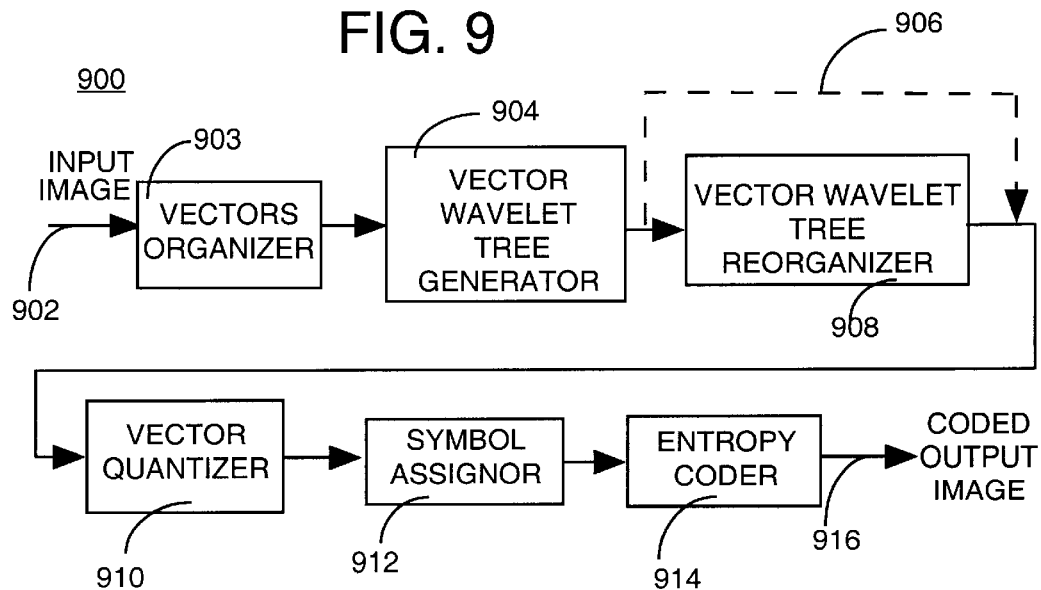
FIG. 9 depicts a block diagram of one embodiment of a vector-wavelet transform.
Figure 10:
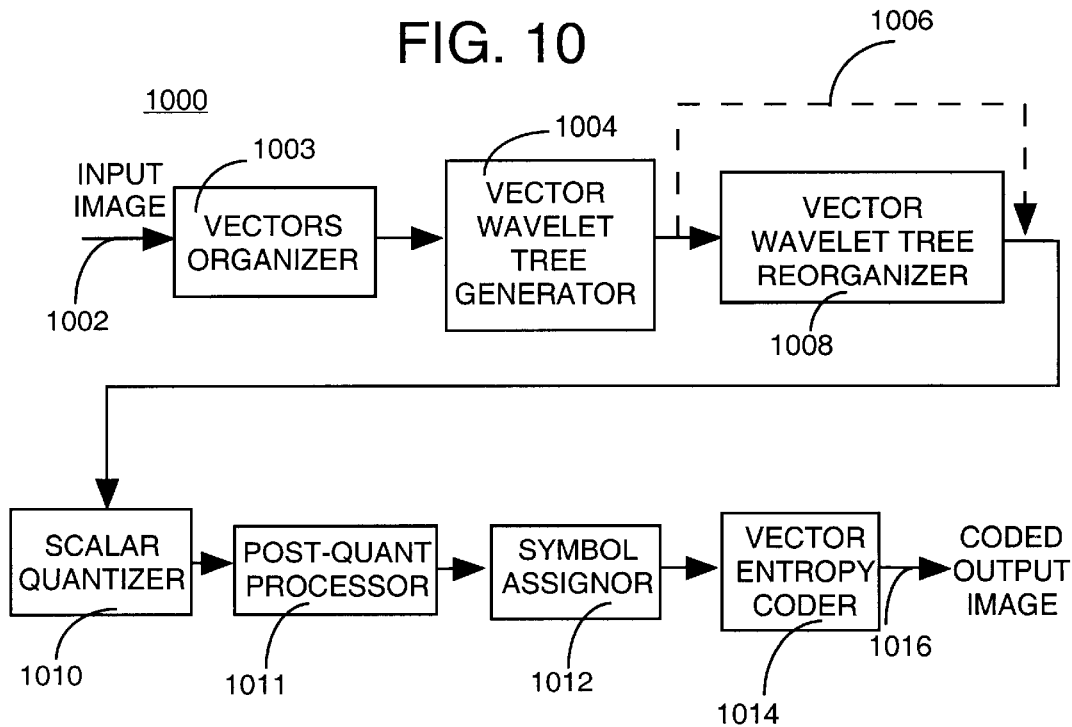
FIG. 10 depicts a block diagram of another embodiment of a vector-wavelet transform.

In contrast, FIGS. 9–10 illustrate the second category, where the inputs are grouped as vectors and are passed through a vector-wavelet transform, to produce the outputs as vectors. In both cases, the result can be viewed as a frame of vectors or objects of wavelet coefficients.

Briefly, in two embodiments of the invention (FIGS. 9 and 10), vectors are defined by a fixed tiling of the 2-D matrix of image or video pixels or residuals and the wavelet transform computed is a vector wavelet transform. Then, either vector quantization or scalar quantization is combined with vector zerotree entropy coding to yield a coded output image.

In another four embodiments of the invention (FIGS. 11 and 12), a scalar wavelet transform is computed and then either vectors are defined by a fixed tiling of the 2-D matrix of wavelet coefficients at the coarsest scale or objects of arbitrary size and shape are determined by a segmentation algorithm (i.e., producing two embodiments). In turn, the vectors or objects are either vector quantized or scalar quantized in combination with vector zerotree entropy coding to yield a coded output image (i.e., producing another two embodiments for a total of four embodiments). One form of a vector wavelet is disclosed by W. Li and Y.–Q. Zhang, "Vector-Based Signal Processing and Quantization for Image and Video Compression", *Proceedings of the IEEE*, vol. 83, pp. 317–335, Feb. 1995.

Figure 13:
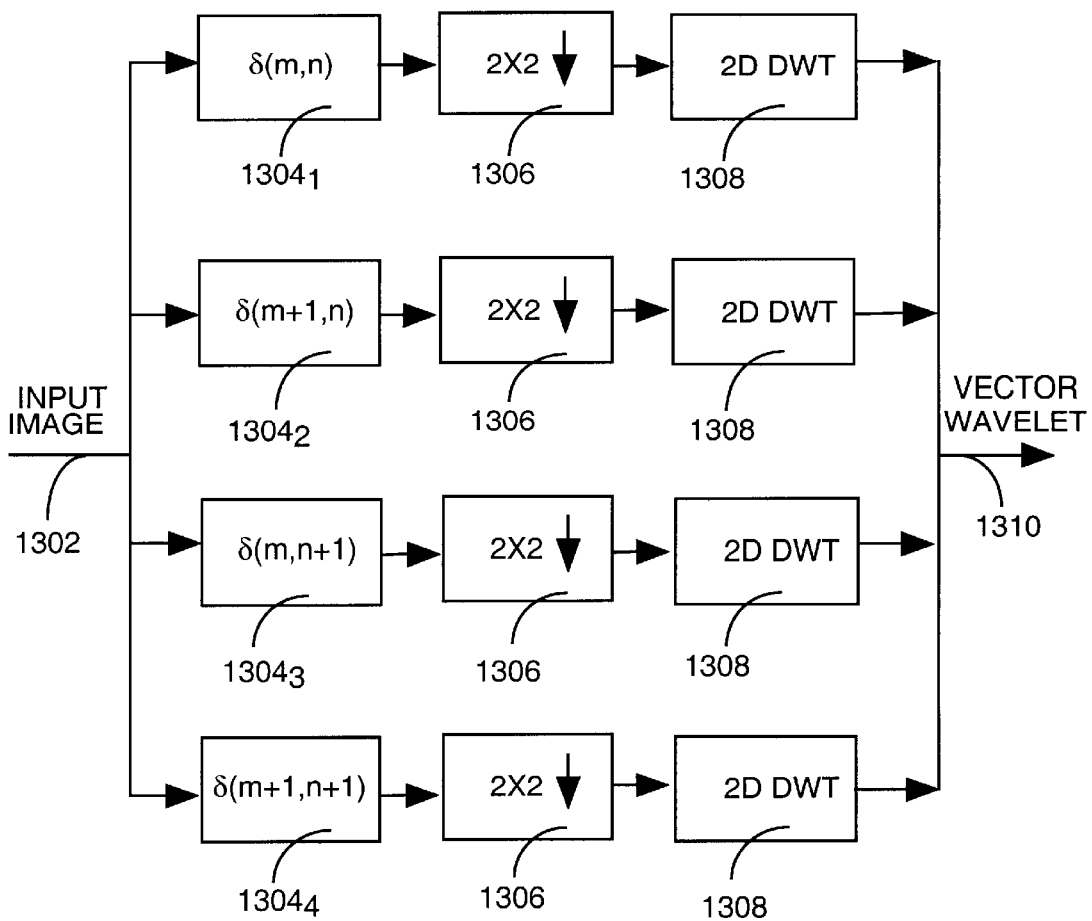
FIG. 13 depicts an example of a vector wavelet.

FIG. 13 illustrates an example of a vector wavelet. A vector wavelet of an image or video residual is a transform whereby adjacent samples of the image or video residual are grouped together to form vectors and then the wavelet transform is applied to those vectors. A vector wavelet transform is computed by the following steps: subsampling the frame to obtain a number of subsampled frames of spatially offset frame-representative signals; transforming each of the subsampled frames by a discrete wavelet transform to obtain a corresponding number of frames of wavelet transform coefficient-representative signals; and forming vector-representative signals from corresponding coefficient-representative signals of the respective frames of coefficient-representative signals.

Namely, the frame (input image) 1302 is decomposed into its 2-D polyphase components. Each polyphase component is a spatially-offset frame of the original frame as illustrated by the four (4) delta functions $1304_1$–$1304_4$. Each spatially-offset frame is then subsampled with times four subsampling, i.e., times two subsampling in each of two dimensions by subsampler 1306 to produce the polyphase component. In turn, a wavelet transform 1308 is applied to each polyphase component, and then vectors are formed by grouping together the transform coefficients, one from each wavelet-transformed component, with the same indices. In this manner, vectors of m×n pixels are transformed into vectors of m×n coefficients 1310.

Vector wavelet transform can also be viewed as a number of overlaying frames and each vector or object comprises one coefficient from each frame where those coefficients all share the same index. The number of frames is equal to the dimension of the vectors or size of the objects.

The various embodiments are now discussed in detail with reference to FIGS. 9–12. More specifically, FIGS. 11–12 illustrate four embodiments that apply scalar-wavelet transformation followed by vectors (or objects) grouping. Since the encoders of FIGS. 11 and 12 share many similarities, the various embodiments are discussed simultaneously below through the use of numerical labels.

The encoder 1100 (1200) contains a wavelet tree generator 1103 (1203), a vectors or objects organizer 1104 (1204), an optional vector/object wavelet tree reorganizer 1108 (1208), a vector quantizer 1110 (a scalar quantizer 1210 with a post-quantization processor 1211), a symbol assignor 1112 (1212), and an entropy encoder 1114 (a vector entropy encoder 1214). Each of these components is connected in series to process an image at port 1102 (1202) into a coded output image at port 1116 (1216).

The wavelet tree generator 1103 (1203) performs a wavelet hierarchical subband decomposition to produce a conventional wavelet tree representation of the input image 1102 (1202) as discussed above. In turn, vectors or objects organizer 1104 (1204) defines vectors by a fixed grouping of adjacent coefficients in the low-low band of the wavelet transform. Objects are defined by applying a segmentation algorithm to the wavelet coefficients of the low-low band. The segmentation is assumed to be complete and nonoverlapping. Therefore, each coefficient in the lowlow band is an element in one and only one vector or object. Various segmentation algorithms can be applied to the present invention, such as disclosed by Patrick Campbell McLean, in "Structured Video Coding", master thesis submitted to the Media Arts and Science Section, Massachusetts Institute of Technology, June 1991 or pending U.S. patent application Ser. No. 08/339,491 filed on Nov. 14, 1994.

Figure 14:
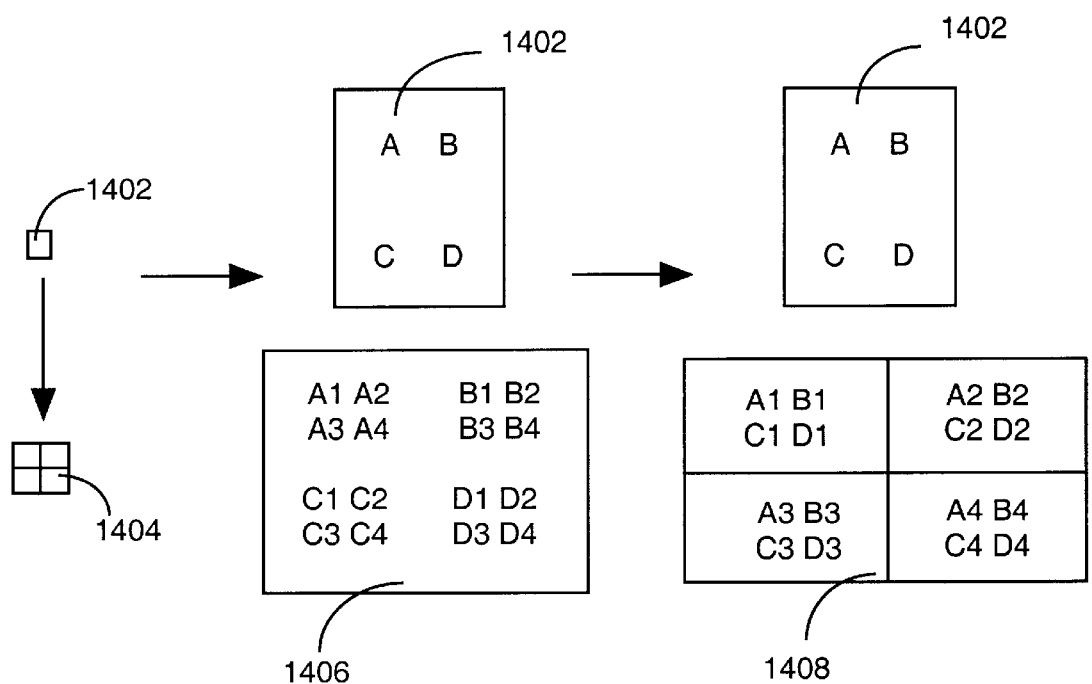
FIG. 14 depicts a vector parent-child relationship.

More specifically, referring to FIGS. 14–15, the vector 1402 or object 1502 is propagated into higher bands by upsampling to define an outline 1404 (1504) at the next finer scale. In order to maintain the vectors and/or objects at the same size as in the coarser scale, the coefficients of each vector or object within the outline are regrouped into four vectors 1406 or objects 1506 as illustrated in FIGS. 14–15. The vector or object at the coarser scale is called the vector or object parent and the four vectors or objects at the next finer scale are called vector or object children. The four vector/object children are extracted from the outline by taking the four polyphase components 1408 (1508). This is equivalent to a shifted subsampling of the outline. Examples of the vector parent-child relationship and object parent-child relationship are shown in FIGS. 14 and 15, respectively. These relationships define vector or object wavelet trees.

Vector or object wavelet trees are similar to the wavelet trees of scalar ZTE coding except that at each node of these vector or object wavelet trees there is a vector of wavelet coefficients instead of a single value. As is done in scalar ZTE coding described above, each tree is traversed depth-first from the root in the low-low band through the children and grandchildren. As nodes are traversed, coefficients are quantized according to the current quantization specification. Returning to FIGS. 11 and 12, this quantization can be done as a vector of scalar quantizations by scalar quantizer 1210 or as a single vector quantization by vector quantizer 1110. Various vector quantization techniques can be applied as disclosed by Allen Gersho et al. in "Vector Quantization and Signal Compression", Kluwer Academic Publishers, (1992).

Figure 16:
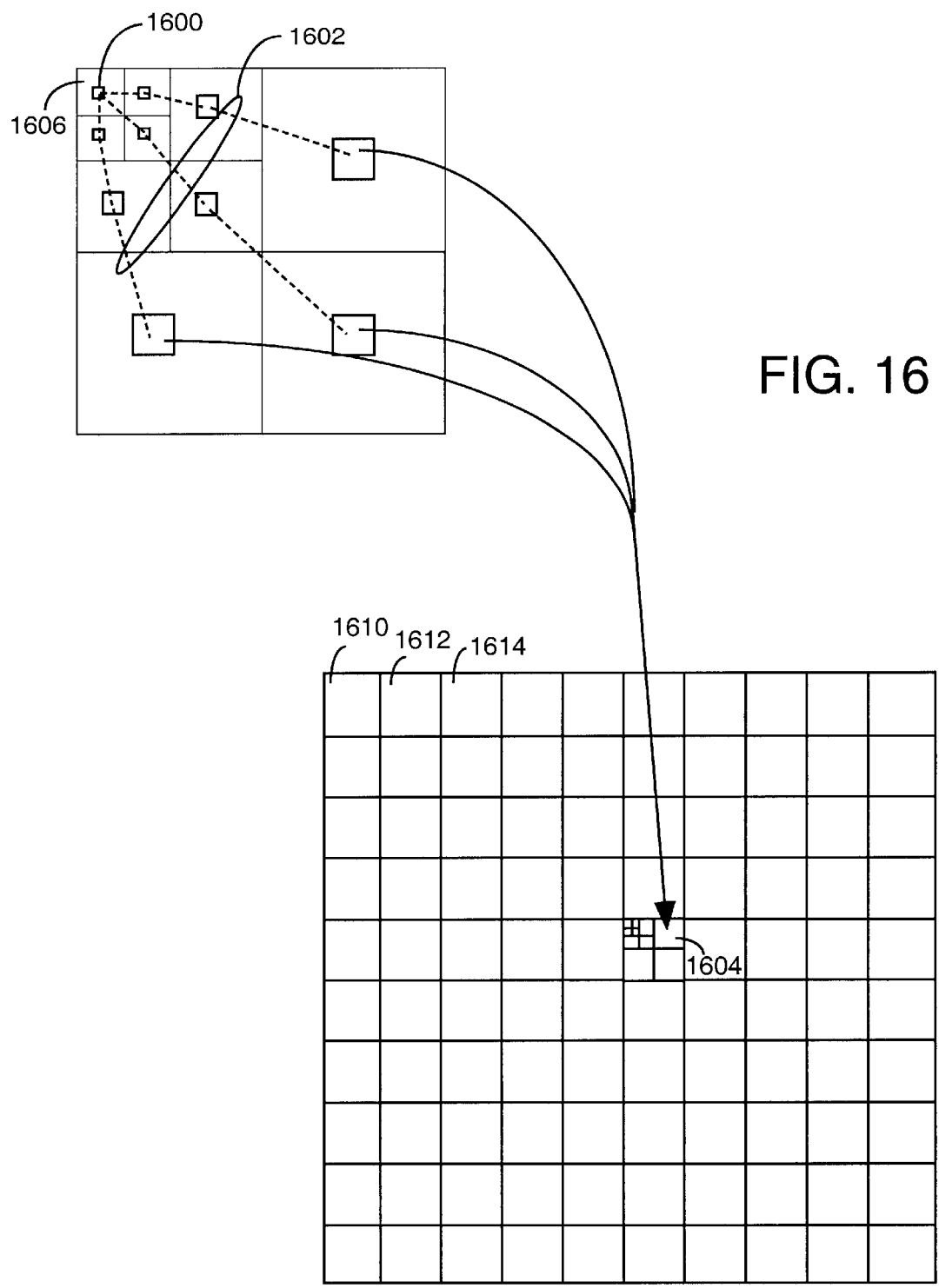
FIG. 16 depicts the reorganization of the coefficient vectors of each wavelet tree to form a "wavelet block"

Similar to the scalar ZTE coding as described above, it is beneficial to reorganize the coefficient vectors of each wavelet tree to form a "wavelet block" as shown in FIG. 16. To facilitate the depth-first scanning pattern, the invention may optionally reorganize the quantized coefficients of each tree to form a "wavelet block" 1604. As shown in FIGS. 11 and 12, the reorganization is accomplished in the vectors/objects wavelet tree reorganizer 1108 (1208) prior to quantization. Since reorganization is optional, both FIGS. 11 and 12 depict the optional nature of the reorganizer as path 1106 and path 1206 which respectively bypass the reorganizer and its associated function.

FIG. 16 schematically depicts a wavelet block 1604 that is generated by the invention. Each wavelet block 1604 of a frame comprises those coefficient vectors at all scales and orientations that represent the frame at the spatial location of that block organized in ascending frequency order from parent to children to grandchildren.

Namely, the invention maps a tree 1602 extending from a vector 1600 in the low-low band 1606 ($LL_3$) in the wavelet tree into a wavelet block 1604. Such a structure permits the quantization factor, for the case of scalar quantization, or the codebook (e.g., a lookup table that defines one index for each vector given), for the case of vector quantization, to adapt to each block according to where the block is spatially located and thus what it represents in the frame.

By using a depth-first scanning pattern, each wavelet block is completely scanned to quantize its coefficient vectors before the next block is scanned and so on. For example, block 1610 is completely scanned, then block 1612, then block 1614, and so on in a raster scan pattern through the frame of wavelet blocks. The ordering of blocks does not have to be in a raster scan pattern, but can be any order as desired by the application.

Furthermore, this invention presents two distinct methods for performing the quantization of the vectors of wavelet coefficients. Returning to FIGS. 11 and 12, quantization can be performed as scalar quantization on each element of each vector, or it can be performed as vector quantization on each vector. At each node of each tree, a symbol assignor 1112 (1212) assigns a symbol to characterize the quantized vector at that node. The symbols and the quantized coefficient values are all encoded using an entropy coder 1114 (1214), such as an arithmetic coder.

After either type of quantization, zerotrees exist wherever the coefficient vector at a node is the zero vector and all descendants are zerotrees. The trees are efficiently represented and coded by assigning symbols to represent the nodes and by pruning the trees at zerotrees. An arithmetic coder is used to assign the minimum number of bits to only those symbols and values needed by the decoder to faithfully reconstruct the trees of wavelet coefficient vectors.

One embodiment of this invention (as shown in FIG. 12) uses scalar quantization of the elements of the vectors of wavelet coefficients. After quantization, each vector will contain either all zeros or one or more nonzero values. A vector zerotree exists where there is a zero vector at every node of the tree. A vector zerotree root is the root of a vector zerotree. The coefficient vector at a vector zerotree root is the zero vector and all descendants of the vector zerotree root are themselves vector zerotree roots. Similar to the scalar case, as an option, one can use Vector Isolated Zero symbol, which define a zero vector with some nonzero descendants.

Zerotree roots are important because trees can be pruned at zerotree roots and therefore no bits are needed to code the coefficients that have been pruned away. Therefore, to increase coding efficiency, it is desirable to have as many zerotrees after quantization as possible. One method is to employ a "post-quantization processor" 1211 (1011) to perform some post-quantization processing (as illustrated in FIGS. 10 and 12) of each vector in an effort to change it to the zero vector when doing so would cause only negligible additional distortion to the final reconstructed frame. A measure of each vector can be computed and when below some threshold, the vector would be set to zero. Different measures can be used for this post-quantization which entirely depends on the application. For example, one may use L1 norm, i.e., sum absolute of elements as the measure.

After scalar quantization of the vector elements and post-quantization processing to force vectors to the zero vectors where appropriate, scanning and classification of the tree nodes is done in a manner similar to that in scalar ZTE coding. Each node is assigned one of three symbols: "zerotree root", "valued zerotree root", and "value" (and optionally, Isolated Zero). These symbols have the same meaning as in scalar ZTE coding, except that the nodes are vectors and the classification of zero or nonzero refers to the whole vector. An entropy coder is used to code the symbols and the tables of values. The tables of values are constructed as in scalar ZTE coding.

One embodiment of this invention (as shown in FIG. 11) uses vector quantization of the vectors of wavelet coefficients. Vector quantization (VQ) is a mature field and various forms of desired VQ can be used. As discussed above, it is desirable to increase the number of zerotree roots when doing so does not significantly increase the distortion of the reconstructed frame. To achieve this result, the VQ can be adapted to incorporate a form of dead zone (a volume in N-dimensional space around the origin in which all vectors are quantized to zero vector) whereby vectors with a measure below some threshold are mapped to the index that reconstructs as the zero vector.

Vector quantization replaces the vector at each node of the tree with an index into a codebook of vectors that selects the best reconstruction vector for that node. The Codebooks are generated offline by training the encoder using sample training set of images. After vector quantization, scanning and classification of the tree nodes is done in a manner similar to that in scalar ZTE coding. Each node is assigned one of three symbols:

"zerotree root", "valued zerotree root", and "value" (and optionally, Isolated Zero). These symbols have the same meaning as in scalar ZTE coding, except that the nodes are now indices into a codebook and zero or nonzero refers to the codebook entry for each index. An entropy coder is used to code the symbols and the tables of indices. The tables of indices are constructed as in scalar ZTE coding.

FIGS. 9 and 10 illustrate alternative embodiments of the present invention that use the vector wavelet transform. Again, since the encoders 900 and 1000 of FIGS. 9 and 10 are similar to the encoders of FIGS. 11 and 12 respectively, devices 908–914 and 1008–1014 are not discussed. Since these devices perform the same functions as those of 1108–1114 and 1208–1214 respectively, the descriptions for these devices are identical to the discussion above.

However, unlike encoders 1100 and 1200, the encoders 900 and 1000 employ a vector organizer 903 (1003) in conjunction with a vector wavelet tree generator 904 (1004), as discussed above with reference to FIG. 13. Namely, steps 1304$_{1-4}$ collectively constitute vector organizing, while steps 1306 and 1308 collectively constitute a vector wavelet transform, thereby generating a vector wavelet tree 1310. After the vector wavelet trees are generated, the encoders 900 and 1000 behave similarly to the encoders 1100 and 1200 respectively.

Those skilled in the art will realize that although the vector or object wavelet coding incorporates the Zerotree Entropy (ZTE) coding method, it can also be implemented with other coding method such as the Embedded Zerotree Wavelet (EZW) algorithm.

The present invention further includes a method for handling "unbalanced" wavelet trees. Although this method is described below with reference to a zerotree, the present invention is not limited to the application of zerotrees, but can be implemented for any wavelet trees in general, including the concepts of vector and object wavelets as discussed above. Furthermore, the present invention can be implemented in conjunction with any wavelet encoding methods, e.g., ZTE and EZW as discussed above.

Figure 17:
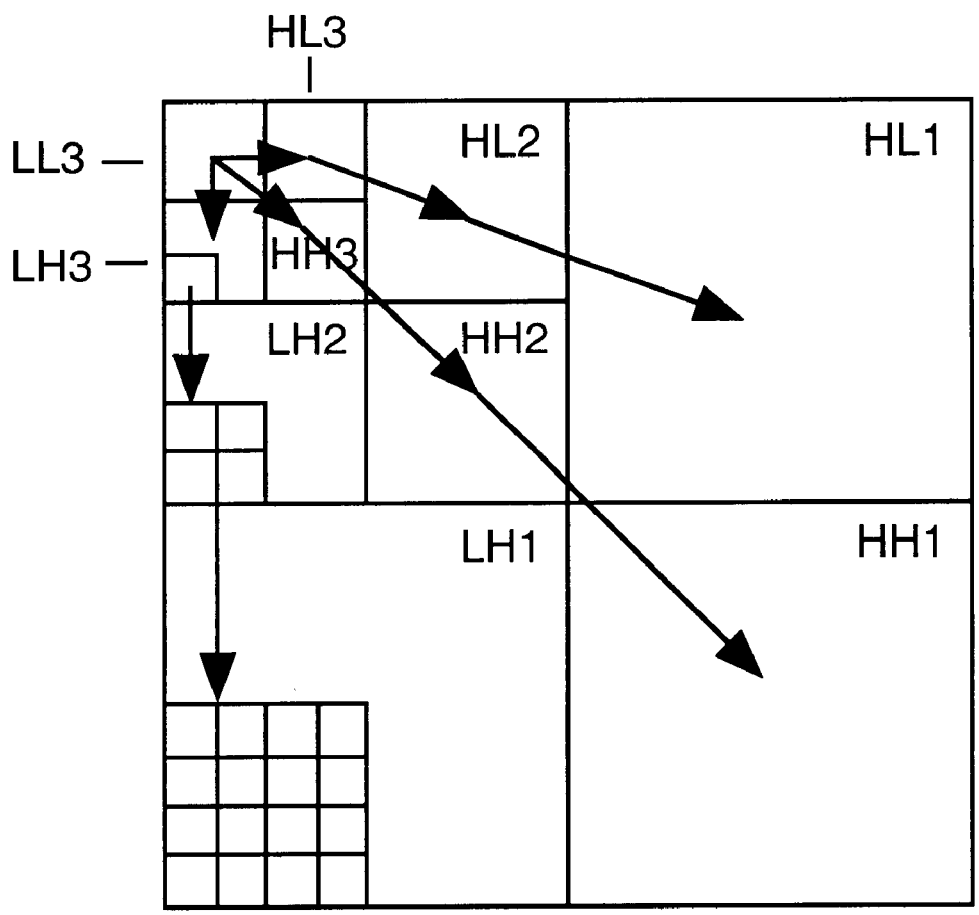
FIG. 17 is a schematic illustration of parent-child dependencies of subbands in an image decomposed to three scales within a balanced wavelet tree.
Figure 18:
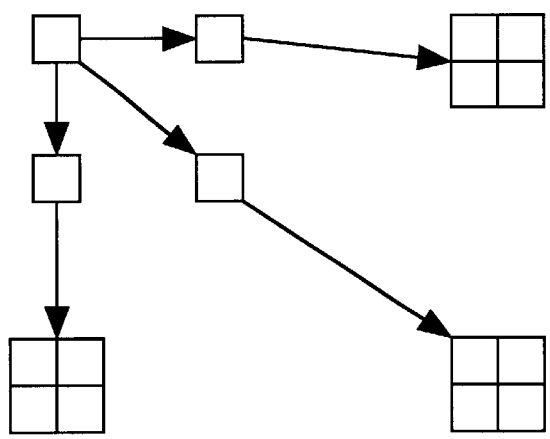
FIG. 18 is a schematic illustration of a balanced tree.

Generally, wavelet decomposition (transform) is applied to an input image having an "even-length" size. Namely, the input image will be decomposed such that in each frequency resolution, all subband must have one size and the input image is decomposed to only that many levels of wavelet decompositions that provide equally sized subbands, as illustrated in FIGS. 4 and 17. This is generally referred to as "uniform wavelet decomposition" and the wavelet trees produced by this decomposition are referred to as "balanced" trees as illustrated in FIG. 18.

Figure 19:
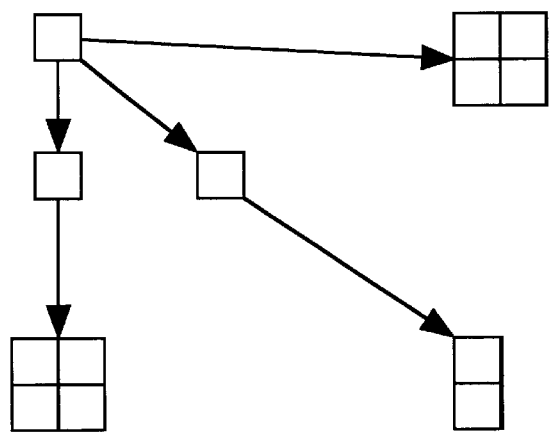
FIG. 19 is a schematic illustration of an unbalanced tree.

However, images and video frames which do not satisfy the above condition, will generate "unbalanced" trees upon wavelet decomposition, as shown in FIG. 19. Namely, one or more child node and/or a grandchild node (and so on), may not be present after decomposition. One simple example for this case, would be an image with either height or width (or both) of odd length, i.e., image size of (2n+1)×(2m+1) where n and m are integer numbers. This non-uniformity in the wavelet tree after wavelet decomposition creates a unique wavelet tree structure, which will reduce the coding efficiency of the coding system. Namely, since the decoder is expecting a balanced wavelet tree, additional information must be forwarded to the decoder to assist the decoder in reconstructing the encoded image correctly from the "unbalanced" wavelet trees, thereby consuming precious bits that are available for coding the images.

Two methods exist for coding images that produce unbalanced trees. In the first method, the input image or its wavelet coefficients are padded with enough extra pixels to provide balanced trees after wavelet decomposition. This method is not desirable due to its expansion of data points and therefore reduces the coding efficiency. The second method specifically defines the parent-child relationship for each unbalanced tree separately. The main drawback here is the additional complexity that is required at both the encoder and the decoder. The extra information needed to describe the unique parent-child relationship also reduces the coding efficiency.

Figure 24:
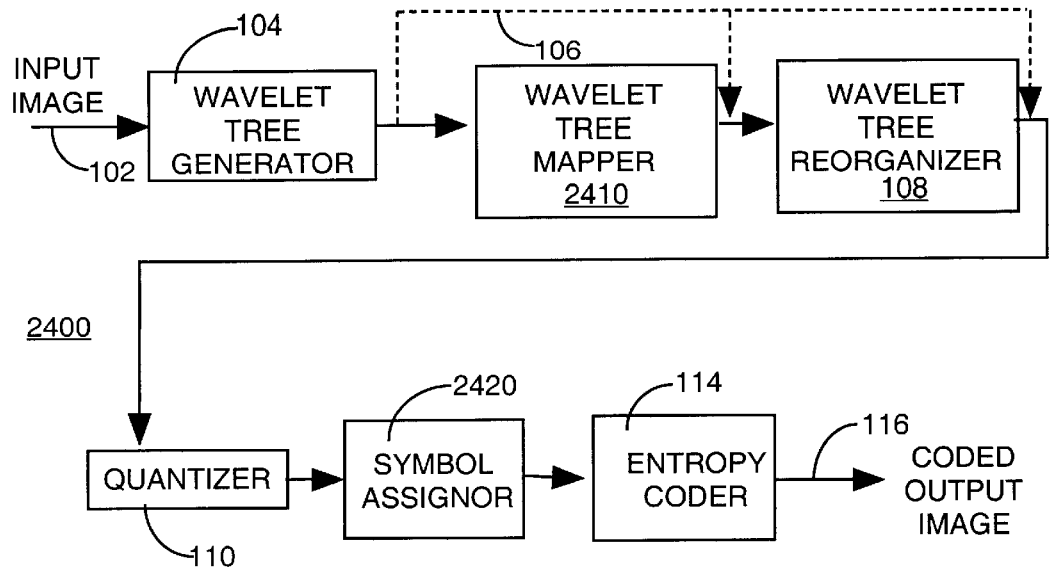
FIG. 24 is a block diagram of another embodiment of an image encoder of the present invention.
Figure 25:
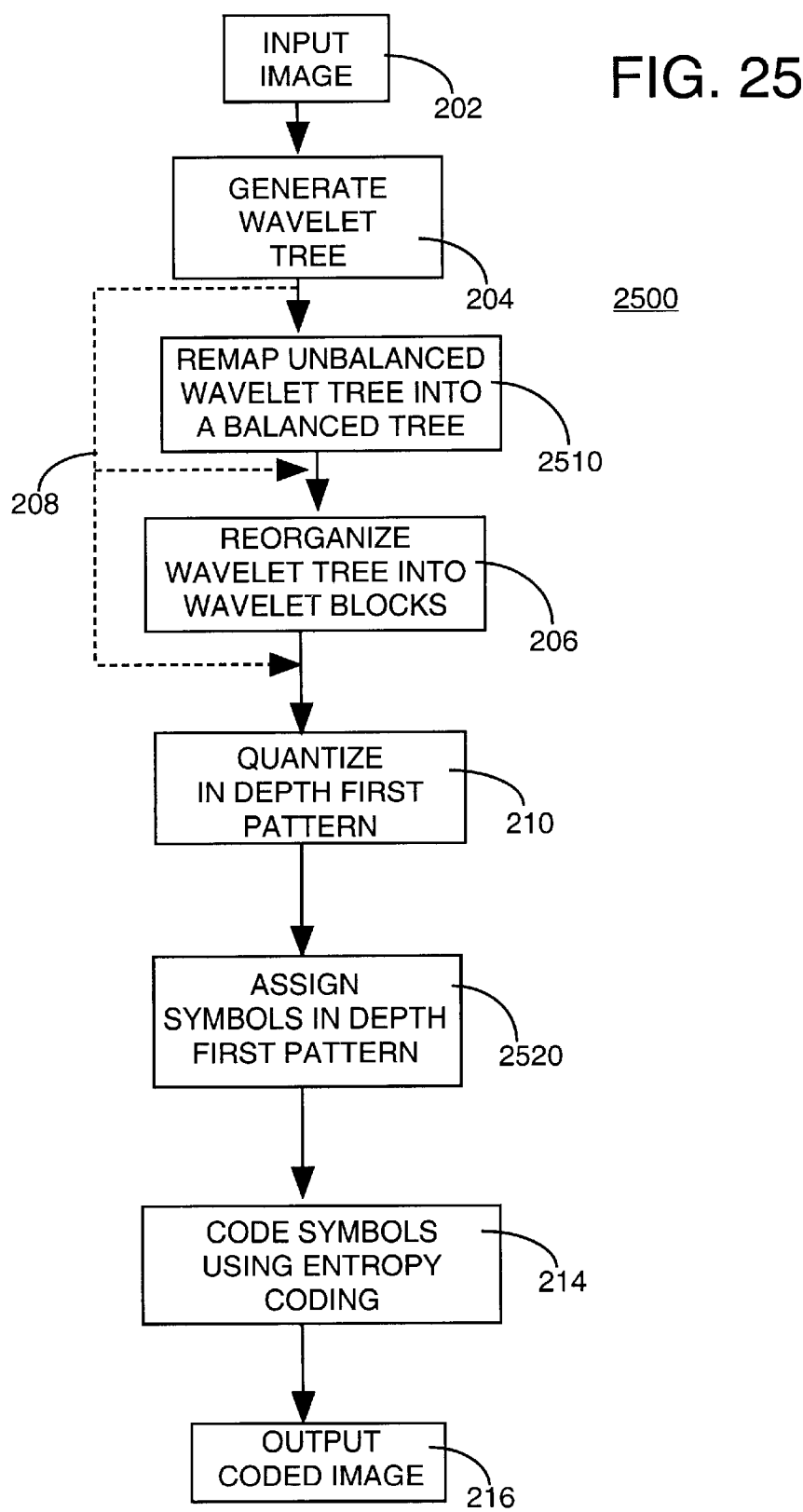
FIG. 25 is a flowchart illustrating the encoding method of the encoder shown in FIG. 24.

In the present invention, unbalanced trees are mapped to balanced trees first and then coded without any additional overhead. The present invention is described below from both perspectives, the encoder and the decoder. Again, ZTE is used to describe the present invention, but the present invention is not so limited and other coding methods can be employed.

a) At the encoder:

FIG. 24 depicts a block diagram of an encoder 2400 of the present invention and FIG. 25 depicts a flowchart representation of the operation of the encoder 2400 of FIG. 24. To best understand the invention, the reader should simultaneously consult both FIGS. 20, 24 and 25 while reading the following description of the invention.

The encoder 2400 contains a wavelet tree generator 104, an optional wavelet tree mapper 2410, an optional wavelet tree reorganizer 108, a quantizer 110, a symbol assignor 2420, and an entropy encoder 114. Each of these components is connected in series to process an image at port 102 into a coded output image at port 116. It should be noted that the encoder 2400 is similar to the encoder 100 of FIG. 1, where similar sections are illustrated with identical numeric labels. Namely, encoder 2400 incorporates an additional wavelet tree mapper 2410, which, in turn, affects the function of the symbol assignor 2420. As such, the wavelet tree mapper 2410 and the symbol assignor 2420 are further described below, whereas the descriptions of other sections (or steps in FIG. 25) are provided above.

Referring to FIGS. 24 and 25, an arbitrary shape image (input image) is decomposed by a wavelet tree generator 104. If the input image is decomposed into a balanced wavelet tree, then the function performed by the wavelet tree mapper 2410 is not necessary and can be bypassed via path 106 in FIG. 24 and path 208 in FIG. 25. However, if the input image is decomposed to wavelet subbands using an arbitrary-shape wavelet transform, then the resulting subbands in each frequency resolution may have different sizes. As a simple example, consider a rectangular object with height and width of odd length. The samples representing this object are not the same in size across different subbands which translate to an unbalanced tree representation of the object. In such case, the resulting unbalanced wavelet tree is remapped by wavelet tree mapper 2410.

Figure 20:
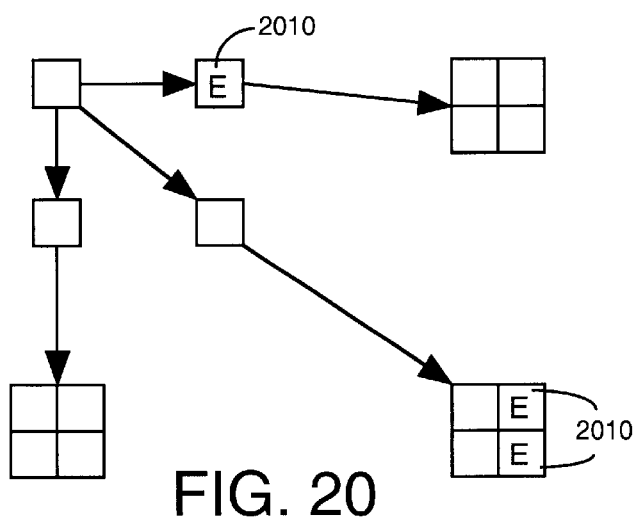
FIG. 20 is a schematic illustration of a balanced tree with inserted empty nodes.

The wavelet tree mapper 2410 (step 2510 in FIG. 25) reconstructs a new wavelet coefficient frame (or wavelet tree structure). The new wavelet frame has same sized subbands in each frequency orientation, as shown in FIG. 20. The new wavelet subbands are also dyadic. Namely, each new subband is large enough to accommodate all the coefficients from the corresponding band of the original wavelet transform. The upper left corner of each new subband is filled by the coefficient from the original wavelet subband and the empty locations (missing nodes) are marked or replaced with children nodes having no information marked as "EMPTY" (E) 2010.

In turn, coding method such as the zerotree coding method (e.g., steps 210–214 of FIG. 2) as discussed above is applied to the new "balanced" wavelet coefficients. All node are scanned based on the order defined in the zerotree method. However, the addition of the "EMPTY" node requires modification to the function performed by the symbol assignor 2420 (step 2520 in FIG. 25).

More specifically, if a node is not "EMPTY", it is coded as an ordinary node. An "EMPTY" node is skipped during the scanning of the trees, meaning that in the significant map, a new symbol "SKIP" is assigned to the node. Nodes with symbol "SKIP" are not coded, therefore they do not add any overhead. Namely, the information (or magnitude) in the node is not coded, but the symbol "SKIP" is encoded and transmitted. Thus, the symbol assignor 2420 incorporates an additional symbol "SKIP" to those symbols as described for the above ZTE method.

Furthermore, the SKIP nodes are treated like a coefficient having a value zero. As such, the present invention does not alter the symbol designation scheme of the zero tree coding method.

Figure 26:
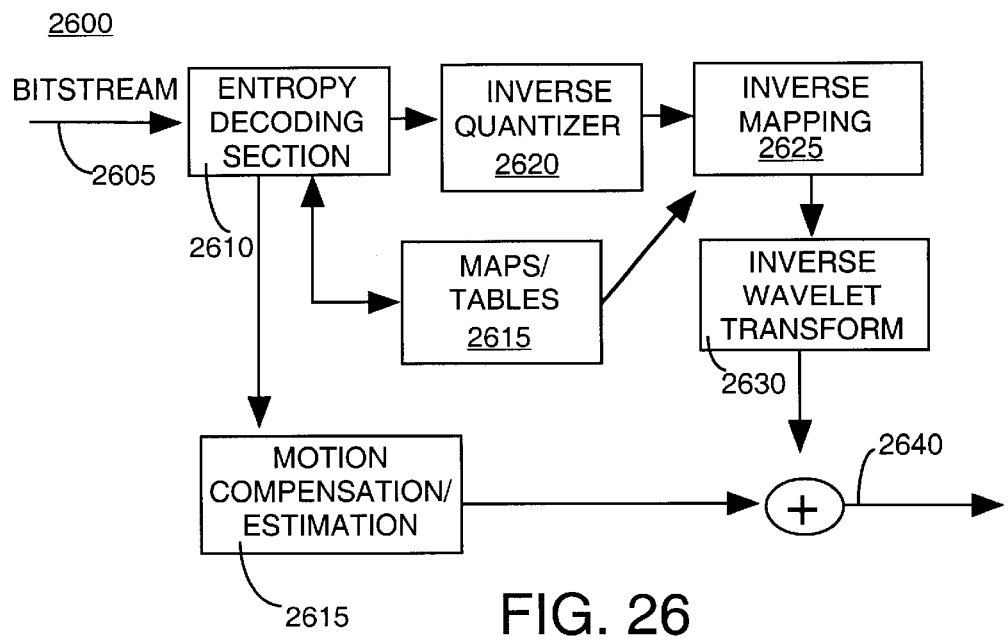
FIG. 26 is a block diagram of an image decoder of the present invention.

Finally, although the wavelet tree mapper 2410 is only illustrated in conjunction with the encoder of FIG. 1, it should be understood that the wavelet tree mapper 2410 can be incorporated with the encoders 900, 1000, 1100 and 1200 in similar fashion to address unbalanced wavelet trees.

b) At the decoder:

FIG. 26 depicts a block diagram of a simplified structure of a decoder 2600 for decoding a coded output image (bitstream) 2605, e.g., the coded output image from the encoder 2400. The decoder 2600 comprises an entropy decoding section 2610, a motion compensation/estimation section 2615, an inverse quantizer section 2620, an inverse mapping section 2625, an inverse transform section 2630 and a storage (or memory) 2615 for the retrieval and storage of various maps and tables, e.g., significance map, symbol lists, various codebooks, and/or entropy code tables.

The decoder 2600 accepts an encoded bitstream (e.g., encoded video images) on path 2605 and decodes the various data elements which are used to produce a decoded output on path 2640. The encoded bitstream can be received directly from a transmission channel or from an input buffer (not shown).

Specifically, the encoded video bitstream is received by the entropy decoding section 2610, which decodes the picture type and all other information via a plurality of entropy code tables. Various mode control information are forwarded to the motion compensation/estimation section 2615 which may comprise a backward motion compensation (MC) section, an interpolated MC section, a forward MC section, an intra coding section and various frame storage buffers (memory). The proper selection of a particular motion compensation or intra coding section depends upon the picture type of a decoded picture. The decoded motion vectors, if any, giving the displacement from the stored previous and/or future pictures are also received by the motion compensation/estimation section 2615. In brief, the previous and future reference pictures are stored in the previous frame memory buffer and future frame memory buffer (not shown) respectively. These stored frames are used in conjunction with the motion vectors to produce a predicted image.

The entropy decoding section 2610 also decodes the quantized coefficients corresponding to the quantized coefficients of the wavelet tree.

The decoded quantized coefficients are forwarded to the inverse quantizer 2620 to recover the wavelet coefficients. The recovered wavelet coefficients are passed to the inverse mapping section 2625.

Prior to performing the inverse wavelet transform of section 2630, the wavelet coefficient frame is remapped to its original structure. More specifically, the coefficient frame (wavelet tree) is initially filled with zeros for all nodes. As the magnitudes and indices for relevant nodes are decoded, the coefficient frame is updated. It should be noted that the bitstream is decoded based on the tree scanning order employed by the encoder, e.g., encoder 2400. During decoding for each node, if the node symbol is not "SKIP", the symbol and its value are decoded and used to update the coefficient frame. Nodes with "SKIP" symbols are skipped. Namely, "SKIP" symbols, when detected, are assigned as "EMPTY" nodes.

The decoded wavelet transform coefficients are then mapped back to a frame of original size by inverse mapping of the one described in the encoder 2400. Namely, the "EMPTY" nodes are removed from the coefficient frame. Finally, the inverse wavelet transform is applied to the wavelet coefficients and the decoded image is reconstructed. Finally, depending on the coding mode, the decoded image can added to a predicted image, if any, to produce the decoded picture on path 2640.

In order to achieve a better quality and more efficient coding of arbitrary shape images and video objects, the disclosed method processes unbalanced trees without adding any extra overhead, i.e., without consuming precious bits to inform the decoder of the structure of the unbalanced trees. The present method incorporates an efficient mapping method which can be incorporated with any wavelet tree based coding scheme, including zerotree encoding methods.

Thus, a complementary decoder 2600 is described for the above encoder 2400. However, it should be understood that complementary decoders for the encoders 100, 900, 1000, 1100 and 1200 can also be implemented in similar fashion as described for the decoder 2400.

Namely, corresponding inverse processing steps are employed to decode the encoded signal to derive the original input image.

The present invention further includes a method for using a DC/AC tables and prediction. In the ZTE coding method, a plurality of tables are used to code the significant symbols within an entropy coder, e.g., the entropy coder 114 in FIG. 1.

More specifically, an entropy coder uses three different tables "TYPE", "VALZ" and "VALNZ", where table TYPE (significance map) is used to code the significant symbols of each wavelet coefficients, table VALNZ is used to code the wavelet coefficient values with the symbol VZTR or non-zero wavelet coefficient values, which are located at the leaves of the tree and table VALZ is used to code the rest of the non-zero wavelet coefficient values. All frequency bands of the wavelet tree share these tables.

Briefly, the entropy (arithmetic) coder employs these tables to gather statistics to provide insight or reveal a trend as to a range of coefficient values and their locations relative to other coefficient values. Such information can be used by the arithmetic coder to improve coding efficiency, e.g., assigned symbols with less bits to represent frequently encountered types or coefficient values.

Figure 21:
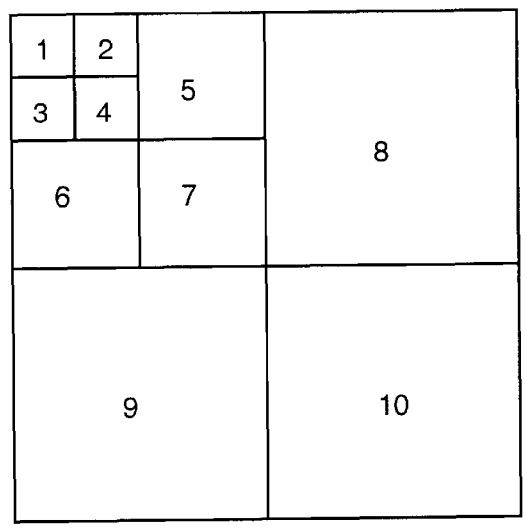
FIG. 21 is a schematic illustration of scanning of the subbands in an image decomposed to three scales.

In the present invention, two additional tables are included to address specific bands within a wavelet tree. More specifically, a "DC" table is used to adaptively update the distribution of wavelet coefficients in the LL band (band 1, as shown in FIG. 21). In addition, a second "AC" table is used to adaptively update the distribution of wavelet coefficients in the HL, LH, and HH bands (bands 2–4, as shown in FIG. 21). The remaining bands employ the two tables VALZ and VALNZ as discussed above. The TYPE table is generally used for the entire wavelet tree.

The use of separate tables in the low resolution bands is premised on the fact that the distribution of wavelet coefficients in these bands are significantly different from those of other resolution bands.

In a second embodiment, additional tables are incorporated for the remaining bands. More specifically, a separate AC2 table is used to adaptively update the distribution of wavelet coefficients in bands 5–7, as shown in FIG. 21. A separate AC3 table is used to adaptively update the distribution of wavelet coefficients in bands 8–10, as shown in FIG. 21 and so on. Generally, one can assign a separate table for each resolution of wavelet transform.

In a third embodiment, for the DC band (band 1 in FIG. 21), the type of the coefficients are considered to be all "values" (non-zero). As such, the symbols for the coefficients in this band are not coded and only the coefficients' values are encoded, thereby further improving the coding efficiency.

Figure 22:
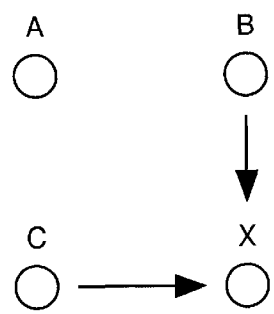
FIG. 22 is a schematic illustration of four non-zero wavelet coefficients.

The present invention further includes a method for improving the coding of coefficients in the LL band using a backward predictive method. Referring to FIG. 22, if a, b, c and x are four non-zero wavelet coefficients in the LL band, a difference value is coded in term of x as follows:

$$\text{if abs(a-b)<abs(a-c), then code x-c} \qquad (1)$$

else, code x-b

In turn, the decoder computes the value x as follows:

if abs(a-b)<abs(a-c), then $$x = \text{value} + c \qquad (2)$$

else, x=value+b
where "value" is the value received by the decoder. In sum, equation (1) indicates that if abs(a-b)<abs(a-c), then x is closer to c (a horizontal coefficient), and if not, then x is closer to b (a vertical coefficient). Thus, this method does not require the transmission of bits (overhead) to describe the direction in which the prediction is based.

Figure 23:
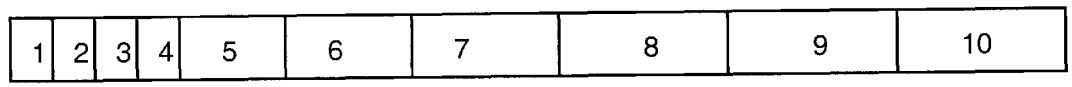
FIG. 23 is a schematic illustration of the locations of the encoded subbands of FIG. 21 in a bitstream.

The present invention further includes a method for providing a spatial scaleable zerotree coding. The method employs a breath first or band first scanning order. Namely, the wavelet coefficients of the low-low bands are coded first, then the coefficients of the other low resolution bands are coded. Next, the coefficients of the next higher resolution are coded and put into a bitstream as illustrated in FIG. 23. The portions of (numbered from 1–10) the bitstream correlate to the bands as illustrated in FIG. 21. This method continues until the coefficients of the last high-high band are coded and placed into the bitstream.

In sum, each resolution allocates or occupies a specific segment of the bitstream. Therefore, partial decoding of the bitstreams can provide lower resolutions of the decoded image. Namely, a lower resolution image can be obtained by applying a partial inverse wavelet transform. This method simplifies the decoder computational complexity for lower resolutions.

Furthermore, it is possible to control the bitrate of only one resolution during the encoding of the image. In order to encode each resolution with arbitrary bitrate, a different quantization step size (quantizer) must be assigned to each resolution. Therefore, for any N-level wavelet transform, N quantization step size must be defined at the encoder.

Figure 27:
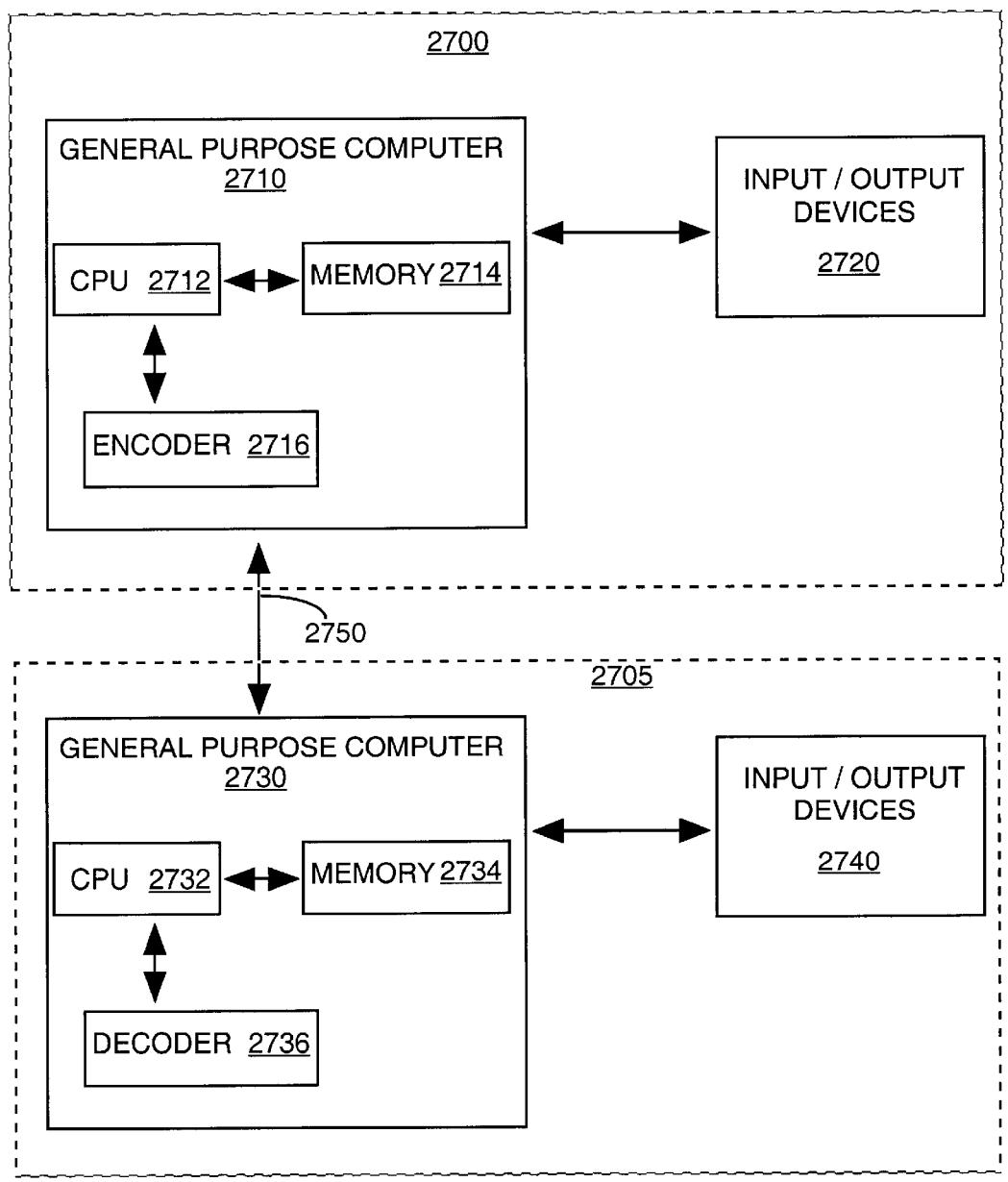
FIG. 27 illustrates an encoding/decoding system of the present invention.

FIG. 27 illustrates an encoding system 2700 and a decoding system 2705 of the present invention. The encoding system 2700 comprises a general purpose computer 2710 and various input/output devices 2720. The general purpose computer comprises a central processing unit (CPU) 2712, a memory 2714 and an encoder 2716 for receiving and encoding a sequence of images.

In the preferred embodiment, the encoder 2716 is simply the encoder 100, encoder 900, encoder 1000, encoder 1100, encoder 1200 and/or encoder 2400 as discussed above. The encoder 2716 can be a physical device which is coupled to the CPU 2712 through a communication channel.

Alternatively, the encoder 2716 can be represented by a software application which is loaded from a storage device, e.g., a magnetic or optical disk, and resides in the memory 2714 of the computer. As such, the encoder 100, encoder 900, encoder 1000, encoder 1100, encoder 1200 and encoder 2400 of the present invention can be stored on a computer readable medium.

The computer 2710 can be coupled to a plurality of input and output devices 2720, such as a keyboard, a mouse, a camera, a camcorder, a video monitor, any number of imaging devices or storage devices, including but not limited to, a tape drive, a floppy drive, a hard disk drive or a compact disk drive. The input devices serve to provide inputs to the computer for producing the encoded video bitstreams or to receive the sequence of video images from a storage device or an imaging device.

The encoding system is coupled to the decoding system via a communication channel 2750. The present invention is not limited to any particular type of communication channel.

The decoding system 2705 comprises a general purpose computer 2730 and various input/output devices 2740. The general purpose computer comprises a central processing unit (CPU) 2732, a memory 2734 and an decoder 2736 for receiving and decoding a sequence of encoded images.

In the preferred embodiment, the decoder 2736 is simply the decoder 2600 or any decoders that are complementary to the encoders 100, 900, 1000, 1100 and 1200 as discussed above. The decoder 2736 can be a physical device which is coupled to the CPU 2732 through a communication channel. Alternatively, the decoder 2736 can be represented by a software application which is loaded from a storage device, e.g., a magnetic or optical disk, and resides in the memory 2734 of the computer. As such, the decoder 2600 and any of complementary decoders of encoders 100, 900, 1000, 1100 and 1200 of the present invention can be stored on a computer readable medium.

The computer 2730 can be coupled to a plurality of input and output devices 2740, such as a keyboard, a mouse, a video monitor, or any number of devices for storing or distributing images, including but not limited to, a tape drive, a floppy drive, a hard disk drive or a compact disk drive. The input devices serve to allow the computer for storing and distributing the sequence of decoded video images.

Although various embodiments which incorporate the teachings of the present invention have been shown and described in detail herein, those skilled in the art can readily devise many other varied embodiments that still incorporate these teachings.

What is claimed is:

1. Method for encoding an input image using a wavelet transform to produce a wavelet tree having a plurality of nodes organized in a parent-child relationship, where said nodes are organized into a plurality of resolution levels with each of said resolution level having one or more bands, said method comprising the steps of:

(a) generating a wavelet tree for the input image, said wavelet tree having a plurality of coefficients, where each of said plurality of coefficients corresponds to a node of said wavelet tree; and (b) coding said plurality of coefficients of said wavelet tree using one or more band dependent tables to code one or more of said plurality of bands, where one of said band dependent tables is used for coding all AC bands within each of said resolution levels.

2. The method of claim 1, where an additional DC table is used for coding a LL band from said plurality of bands.

3. The method of claim 2, wherein said coding step (b) only codes coefficient values of said LL band from said plurality of bands with said DC table.

4. The method of claim 1, where HL, LH, and HH bands from said plurality of bands corresponding to a first resolution level are coded with a first AC table.

5. The method of claim 1, where HL, LH, and HH bands from said plurality of bands corresponding to a second resolution level are coded with a second AC table.

6. The method of claim 1, where HL, LH, and HH bands from said plurality of bands corresponding to a third resolution level are coded with a third AC table.

7. Apparatus for encoding an input image using a wavelet transform to produce a wavelet tree having a plurality of nodes organized in a parent-child relationship, where said nodes are organized into a plurality of resolution levels with each of said resolution level having one or more bands, said apparatus comprising:

a wavelet tree generator for generating a wavelet tree for the input image, said wavelet tree having a plurality of coefficients, where each of said plurality of coefficients corresponds to a node of said wavelet tree; and a coder for coding said plurality of coefficients of said wavelet tree using one or more band dependent tables to code one or more of said plurality of bands, where one of said band dependent tables is used for coding all AC bands within each of said resolution levels.

8. The apparatus of claim 7, where an additional DC table is used for coding a LL band from said plurality of bands.

9. The apparatus of claim 8, wherein said coder only codes coefficient values of said LL band from said plurality of bands with said DC table.

10. The apparatus of claim 7, where HL, LH, and HH bands from said plurality of bands corresponding to a first resolution level are coded with a first AC table.

11. The apparatus of claim 7, where HL, LH, and HH bands from said plurality of bands corresponding to a second resolution level are coded with a second AC table.

12. The apparatus of claim 7, where HL, LH, and HH bands from said plurality of bands corresponding to a third resolution level are coded with a third AC table.

13. A computer-readable medium having stored thereon a plurality of instructions, the plurality of instructions including instructions which, when executed by a processor, cause the processor to perform the steps comprising of:

(a) generating a wavelet tree for the input image, said wavelet tree having a plurality of coefficients, where each of said plurality of coefficients corresponds to a node of said wavelet tree; and (b) coding said plurality of coefficients of said wavelet tree using one or more band dependent tables to code one or more of said plurality of bands, where one of said band dependent tables is used for coding all AC bands within each of said resolution levels.

14. The computer-readable medium of claim 13, where an additional DC table is used for coding a LL band from said plurality of bands.

15. The computer-readable medium of claim 14, wherein said coding step (b) only codes coefficient values of said LL band from said plurality of bands with said DC table.

16. The computer-readable medium of claim 13, where HL, LH, and HH bands from said plurality of bands corresponding to a first resolution level are coded with a first AC table.

17. The computer-readable medium of claim 13, where HL, LH, and HH bands from said plurality of bands corresponding to a second resolution level are coded with a second AC table.

* * * * *